(12) United States Patent
Nix

(10) Patent No.: US 12,050,692 B2
(45) Date of Patent: Jul. 30, 2024

(54) SECURE AND FLEXIBLE BOOT FIRMWARE UPDATE FOR DEVICES WITH A PRIMARY PLATFORM

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 261 days.

(21) Appl. No.: 17/772,330

(22) PCT Filed: Oct. 30, 2020

(86) PCT No.: PCT/US2020/058142
§ 371 (c)(1),
(2) Date: Apr. 27, 2022

(87) PCT Pub. No.: WO2021/087221
PCT Pub. Date: May 6, 2021

(65) Prior Publication Data
US 2022/0405392 A1    Dec. 22, 2022

Related U.S. Application Data

(60) Provisional application No. 62/928,276, filed on Oct. 30, 2019.

(51) Int. Cl.
*G06F 21/57* (2013.01)
*H04L 9/32* (2006.01)

(52) U.S. Cl.
CPC .......... *G06F 21/572* (2013.01); *G06F 21/575* (2013.01); *H04L 9/3249* (2013.01); *H04L 9/3252* (2013.01)

(58) Field of Classification Search
CPC ........ G06F 21/572; G06F 21/575; G06F 8/63; G06F 8/654; G06F 9/4401; H04L 9/3249; H04L 9/3252
See application file for complete search history.

(56) References Cited

U.S. PATENT DOCUMENTS 6,009,177 A    12/1999 Sudia
10,116,645 B1  10/2018 Miller et al.
(Continued)

FOREIGN PATENT DOCUMENTS

EP          3629150 A1 *  4/2020  ........... G06F 21/572
WO    WO-2020052753 A1 *  3/2020
WO       WO2020226466     11/2020

OTHER PUBLICATIONS

ETSI. "Smart Cards; Smart Secure Platform (SSP); Requirements Specification" (ETSI TS 103 465 V15.0.1 (Aug. 2019)) (Year: 2019).*

(Continued)

*Primary Examiner* — Michael Simitoski
(74) *Attorney, Agent, or Firm* — GrowIP Law Group LLC

(57) ABSTRACT

A device can operate a processor, a primary platform, and a nonvolatile memory that includes a first boot firmware for the processor. The nonvolatile memory can comprise a (i) read-only memory for the processor and (ii) a read and write memory for the primary platform. Upon power up, the processor can load the first boot firmware with a first certificate and first set of cryptographic algorithms to verify a digital signature for a second boot firmware, where the second boot firmware is loaded by the processor after the first boot firmware. The primary platform can securely download a secondary platform bundle (SPB) with a boot update image and a second certificate and second set of cryptographic algorithms. The SPB can replace the first boot firmware with the updated first boot firmware. The processor verifies the second boot firmware with the second certificate and the second set of cryptographic algorithms.

20 Claims, 5 Drawing Sheets

(56) References Cited

U.S. PATENT DOCUMENTS

| | | |
|---|---|---|
| 10,380,362 B2 | 8/2019 | Nix |
| 10,389,533 B2 | 8/2019 | Le Saint et al. |
| 10,397,230 B2 | 8/2019 | Callaghan et al. |
| 2012/0210115 A1 | 8/2012 | Park et al. |
| 2014/0122329 A1* | 5/2014 | Naggar .............. G06Q 20/3552 705/41 |
| 2014/0164725 A1 | 6/2014 | Jang et al. |
| 2016/0216978 A1* | 7/2016 | Dangy-Caye ....... G06F 11/1433 |
| 2017/0039053 A1 | 2/2017 | Siluvainathan et al. |
| 2018/0137284 A1 | 5/2018 | Oh et al. |
| 2019/0065749 A1* | 2/2019 | Yang ..................... G06F 21/572 |
| 2020/0084622 A1* | 3/2020 | Yoon ..................... H04W 72/56 |
| 2020/0137572 A1* | 4/2020 | Lee ....................... H04W 12/04 |
| 2020/0221294 A1 | 7/2020 | Kang et al. |
| 2020/0351651 A1 | 11/2020 | Koo et al. |
| 2020/0388377 A1* | 12/2020 | MacDonald ........... G16H 40/40 |
| 2021/0058774 A1* | 2/2021 | Yang .................. H04W 12/086 |
| 2021/0073425 A1* | 3/2021 | Veneroso .................. G06F 9/54 |
| 2022/0053029 A1* | 2/2022 | Koo ........................ H04L 67/51 |

OTHER PUBLICATIONS

GSM Association, "iUICC POC Group Primary Platform requirements", Release 1.0, May 17, 2017.
European Technical Standards Institute (ETSI), "Meeting #81 document SCP(17)000188", Dec. 5, 2017.
Wikipedia, "Elliptic Curve Diffie-Hellman", Mar. 9, 2018.
National Institute of Standards and Technology (NIST) document "NIST SP 800-56A, Recommendation for Pair-Wise Key Establishment Schemes Using Discrete Logarithm Cryptography", Mar. 2007.
GlobalPlatform, "Open Firmware Loader for Tamper Resistant Element", Version 1.3, Jun. 2017.
PCT/US2020/058142, International Searching Authority Written Opinion, dated Feb. 11, 2021.
Wikipedia, "Post-Quantum Cryptography", Feb. 22, 2019.

* cited by examiner

Figure 1c

Cryptographic Parameters 111
w/ Corresponding Boot Firmware (BF) Certificate 160c

| Parameters 111a | PK Key Length 111b | Type 111c | Signature Algorithm 111d | Hash Algorithm 111e | Key Exchange 111f | Cert.BF 160c |
|---|---|---|---|---|---|---|
| 1  (In 160) | 348 | ECC-p384 | ECDSA | SHA3-256 | ECDH | 160c-1 |
| 2 | 256 | ECC-p256 | ECDSA | SHA-256 | ECDH | 160c-2 |
| 3 | 384 | ECC-p384 | ECDSA | SHA3-384 | ECDH | 160c-3 |
| 4 | 3000 KB | Code (PQC) | GeMSS | SHA3-512 |  | 160c-4 |
| 5 | 256 | ECC X25519 | ECDSA | SHA-256 | ECDH | 160c-5 |
| 6 | 3104 | Lattice (PQC) | qTesla-Speed | SHA2-512 | KEM-2 | 160c-6 (e.g. 160c″-x) |
| 7  (In 160*) | 2048 | RSA | DSA | SHA-256 | RSA | 160c-7 |
| 8 | 3072 | RSA | DSA | SHA-256 | RSA | 160c-8 |
| 9 | 14880 | Lattice (PQC) | qTesla-p-1 | SHA3-512 | KEM-3 | 160c-9 |

(Example 111a′) → row 1

(Example 111a″-x) → row 6

(Example 111a″) → row 9

SECURE AND FLEXIBLE BOOT FIRMWARE UPDATE FOR DEVICES WITH A PRIMARY PLATFORM

RELATED APPLICATIONS

The present application is a U.S. National Stage Application of International Application No. PCT/US2020/058142, filed on Oct. 30, 2020, which claims the benefit of U.S. Provisional Patent Application No. 62/928,276, filed on Oct. 30, 2019, both of which are incorporated by reference herein in their entireties.

BACKGROUND

Technical Field

The present systems and methods relate to securely configuring a boot loader for operation by a device, and more particularly using primary platform within the device to securely update the boot loader in order to support secure and flexible update of cryptographic parameters and keys used by the boot loader.

Description of Related Art

The commercial development and deployment of secure processing environments within microprocessors and tamper resistant elements (TRE) can increase security of computing devices such as mobile phones, servers, and networked sensors for the "Internet of Things". A secure processing environment or TRE can enable a device to securely record cryptographic keys and conduct cryptographic operations such as processing digital signatures in an a computing environment that is isolated from other electrical components within the device that may not be secure. Examples available today include an embedded subscriber identity module (embedded SIM), which is also known as an embedded universal integrated circuit card (eUICC), a traditional SIM card, a secure enclave within a "system on a chip", a trusted execution environment (TEE), and other examples are available as well. A common computing architecture includes a processor with multiple cores, where a secure processing core is isolated from the other cores, and the secure processing core can store and read cryptographic keys and conduct cryptographic operations. Other possibilities exist as well, including "switching" a generic processor between an insecure mode to a secure mode.

As the number of transistors and memory cells available for a given surface area of silicon continues to grow, the computational power for secure processing environments continues to increase. Some secure processing environments can operate as a host computing environment and provide the functionality of a virtual machine for different firmware images, such that each firmware image can operate as separate computing environments within the secure processing environment. As one example, secure processing environments can now enable a TRE to operate as a primary platform for hosting potentially a variety of different firmware images or secondary platform bundles, where each of the firmware images can support a different application. As another example, a secure processing environment could operate a Java™ virtual machine, and different firmware images could comprise different Java applets or Java-based applications. Each Java applet could comprise different images for the Java virtual machine. Other possibilities exist as well for a secure processing environment to operate as a primary platform for hosting images such as at least one secondary platform bundle, and the images may also be referred to as a firmware image.

A primary platform both (i) operating within a secure processing environment and (ii) using firmware images can support a variety of useful applications for a computing device. The operation of an example primary platform can perform functions outlined in the GSM Association (GSMA) technical document "iUICC POC Group Primary Platform requirements", Release 1.0 dated May 17, 2017, which is hereby incorporated by reference in its entirety ("GSMA PP Requirements"). Example applications supported by a primary platform using firmware images are identified in Section 3, "Use Cases" and include firmware for an embedded SIM, a traditional universal integrated circuit card (UICC), mobile payments, secure bootstrapping, digital rights management, user identification such as a drivers license, secure access to home automation, a virtual automobile key, and other applications are identified as well.

Further the European Telecommunications Standards Institute (ETSI) has begun developing standards for a "Secure Primary Platform" (SSP) as part of the development of 5G standards, and an SSP could operate as a primary platform as well. As of Oct. 25, 2019, the draft technical standards for an SSP are not published, but will likely support applications similar to those contemplated in the GSMA PP requirements document. However, ETSI has published the requirements for the SSP in the document ETSI TS 103 465 V15.0.0 (2019-05) titled "Smart Cards; Smart Secure Platform (SSP); Requirements Specification" ("ETSI SSP Requirements"), which is hereby incorporated by reference in its entirety. In summary, a primary platform operating within a secure element or tamper resistant element can support the download of firmware, where the firmware can include a secondary platform bundle. The secondary platform bundle can support multiple different use cases as outlined in section 6 of the ETSI SSP Requirements, which are also equivalent to the use cases above in the GSMA PP Requirements document. A need exists in the art for a primary platform to download a firmware image with such as a secondary platform bundle, such that the firmware image can securely update the first boot firmware accessed by a device processor upon power up or reboot of the processor. A need exists in the art for the primary platform to securely download the firmware image for updating the first boot firmware and for the firmware image to securely receive the boot firmware.

A primary concern for commercial and industrial users of networked devices is that the devices remain secured over the lifetime of the devices, where the lifetime may extend for a decade or longer. The security of the device can depend upon a secure boot, such that the first boot firmware or a boot loader can record cryptographic algorithms, cryptographic parameters, and a certificate or public key in order to verify a digital signature for a second boot firmware, where the second boot firmware is loaded and processed by the first boot firmware or boot loader. Without a secure boot and the use of a digital signature for the second boot firmware, which is verified with a digital signature and the public key recorded in the first boot firmware, then the second boot firmware may be compromised, insecure, or subject to hacking attacks in order to have the device use the first boot firmware load insecure or "hacked" second boot firmware. The device could be high value industrial equipment, such as a network router, hospital equipment, transportation vehicles such as airplanes, trucks or trains, or servers for conducting financial transactions. Many other possibilities exist as well for a company to require that computing devices perform a secure boot.

However, over the lifetime of the device, the cryptographic algorithms, parameters, and public keys used by the first boot firmware or boot loader may require updating in order to remain secure. As one example, conventional technology for processing digital signatures in widespread use for boot loaders currently rely on digital signatures processed using either elliptic curve cryptography or RSA based algorithms. Quantum computers are expected to be able to solve the elliptic curve discrete logarithm problem in polynomial time, while classical computers solve the problem in exponential time. As of late 2019, estimates for the number of qubits required to break a 256 bit ECC public key to determine the private key with a reasonable computation time are approximately 2000-4000 qubits. Estimates for the number of qubits required to break a 3072 bit RSA based PKI public key to determine the private key are approximately 4000-8000 qubits. Industry projections of the number of qubits for operating quantum computers shows this number of qubits could be available in approximately 5 to 10 years and likely within 15 years. Consequently, a need exists in the art for computing devices in the coming decade to securely update the cryptographic algorithms, parameters, and public keys used by the first boot firmware or boot loader.

As the standards for operating a primary platform or a secure primary platform (SSP) continue to evolve, new features or the use of new cryptographic algorithms or steps may be introduced, such as support for post-quantum cryptography. As of October, 2019, global standards for widely used post-quantum cryptography algorithms are still under development. A need exists in the art for firmware downloaded by a primary platform securely support a firmware or secondary platform bundle supporting the post-quantum cryptography algorithms, where the firmware can use the post-quantum cryptography algorithms to receive an updated first boot firmware for the device that also supports the post-quantum cryptography algorithms. A need exists in the art for the device to receive an updated second boot firmware which is signed using the post-quantum cryptography algorithms, such that the updated first boot firmware can verify the updated second boot firmware.

Global Platform has released a standard for the secure download of firmware to a primary platform in the document "Open Firmware Loader for Tamper Resistant Element Version 1.3" ("GP OFL"), which is herein incorporated by reference in its entirety. This standard also does not suggest secure steps for (i) a tamper resistant element to update a first boot firmware for a device or (ii) associated required steps for subsequent boot firmware to be supported by an updated first boot firmware. Securely updating both (i) a first boot firmware with parameters and a key and (ii) a second boot firmware with the parameters and a digital signature is a significant technical challenge, since the computing device with the primary platform may include insecure components, such as a generic processor and a generic operating system. In addition, a different server or entity may be responsible for updating the first boot firmware and a second server or entity may be responsible for updating the second boot firmware. A need exists in the art to securely support a first server and entity downloading an updated first boot firmware or boot loader and then a second server or entity configuring the second boot firmware to be supported by the updated first boot firmware.

Many other examples exist as well for needs in the art for the secure configuration of a secondary platform bundle or downloaded firmware for a primary platform, and the above are examples are just a few and intended to be illustrative instead of limiting.

SUMMARY

Methods and systems are provided for the secure update of boot firmware within a device using a primary platform operating within a tamper resistant element. The primary platform (PP) can operate within a tamper resistant element (TRE) and comprise a secure processing environment operating within a computing device. The primary platform can comprise a secure enclave, a secure element, a trusted execution environment (TEE), or a "Smart Secure Platform" as specified by ETSI standards. The computing device can comprise a mobile phone, wireless device, personal computer, laptop, or a networked transducer for the "Internet of Things". The computing device can also comprise a hardware server, router, radio base station, database, and other possibilities exist as well. The device can (i) include insecure components such as a general processor and a general operating system and (ii) communicate with the primary platform using a device driver such as a primary platform agent.

The device can connect with an internet protocol (IP) based network such as the public Internet in order to establish a secure session with a server. The server can comprise an image delivery server (IDS) and receive a ciphertext firmware from an image maker. The image delivery server can comprise a computer with a network interface to communicate with the device via the IP network. The device can be one of a plurality of different devices communicating with the image delivery server.

In exemplary embodiments an image maker can create a generic firmware image for operation on multiple different primary platforms, and the firmware image can comprise a boot update image. As contemplated herein, the boot update image can also be referred to as a boot loader updater. The boot update image can support the primary platform operating with an application and include the logic for securely downloading an updated first boot firmware for the device from a configuration server. The image maker can create the firmware image for a plurality of different primary platforms operating in different devices. The firmware from an image maker can comprise an unbound image or an unconfigured secondary platform bundle, and an image delivery server can bind or bound the boot update image to a particular primary platform/TRE in a device.

The boot update image can include a set of supported cryptographic parameters that specify the setting and values for use with cryptographic algorithms in an operating system of the secondary platform bundle. The boot update image can include an identity of the configuration server (such as, but not limited to a domain name), a certificate of the configuration server, and transport layer security (TLS) parameters to use in a secure session with the configuration server. The device with the primary platform can download the boot update image from an image delivery server and load the firmware image in the primary platform.

The boot update image operating within the primary platform can establish a secure session with the configuration server using the identity of the configuration server, the certificate of the configuration server, and the TLS parameters. The boot update image can query the processor for a processor configuration. The boot update image can forward the processor configuration to the configuration server through the secure session.

The configuration server can select a set of cryptographic parameters for an updated first boot firmware or boot loader for the device. In exemplary embodiments, the selected cryptographic parameters can include support for post-quantum cryptographic algorithms, such as at least set of parameters for a lattice based algorithm, a code based algorithm, or a multivariate based algorithm. The configuration server can also use the selected parameters and the processor configuration to select or process an updated first boot firmware or boot loader for the device. The configuration server can send the boot update image operating in the primary platform the updated first boot firmware or boot loader through the secure session. The configuration server can send the selected cryptographic parameters and associated selected boot firmware public keys or certificates to use the selected cryptographic parameters and verify digital signatures. In exemplary embodiments, the updated boot loader can support both (i) an initial boot firmware operated by the computing device before download of the updated boot loader, and (ii) an updated boot firmware for the computing device. In this manner "backwards compatibility" for the updated boot loader with the initial boot firmware can be maintained for a period of time before the initial boot firmware is deprecated.

After receipt of the updated first boot firmware or boot loader, the device 102 could establish a second secure session with a second boot firmware server. Note that device programs and general software operating on device 102 and outside of the TRE with the primary platform can select the second boot firmware server and establish the second secure session. In other words, the boot update image in the primary platform may not select the second boot firmware server and establish the second secure session. Device 102 can send to the second boot firmware server through the second secure session the set of cryptographic parameters, the processor configuration, and public keys or certificates used by the updated first boot firmware to verify a digital signature for a second boot firmware that the updated first boot firmware loads.

The second boot firmware server can receive the set of cryptographic parameters and the processor configuration and the public key or certificate. The second boot firmware server can select an operating subset of cryptographic parameters from the set of cryptographic parameters. The second boot firmware server can select or process an updated second boot firmware using the operating subset of cryptographic parameters and the processor configuration. The updated second boot firmware can be compatible for the processor with the configuration in the device, such that the processor in the device could use the updated first boot firmware or boot loader to load and execute the updated second boot firmware.

The second boot firmware server can select a public key for the operating subset of cryptographic parameters. The second boot firmware server can request a digital signature over at least the updated second boot firmware from a server recording the private key corresponding to the public key (i) received by the second boot firmware server from the device, (ii) supporting the operating subset of cryptographic parameters, and (iii) used by the updated first boot firmware or boot loader to verify a digital signature for the second boot firmware. The second boot firmware server can receive the digital signature. The second boot firmware server can send the device the updated second boot firmware and the digital signature.

The boot update image operating in the TRE can write the updated first boot firmware or updated boot loader to a first nonvolatile memory that the processor reads upon power up. In exemplary embodiments, the TRE has write access to the first nonvolatile memory that the processor reads upon power up, but the processor does not have write access to the first nonvolatile memory that the processor reads upon power up. In other words, a memory interface could allow TRE and PP and the boot update image to write to the first nonvolatile memory, but the memory interface could prevent a processor from writing to the first nonvolatile memory.

The device and processor can write the received updated second boot firmware with the digital signature to a second nonvolatile memory, where the processor can read and write to the second nonvolatile memory. The location or address of the second nonvolatile memory can comprise the address where the updated first boot firmware or updated boot firmware starts to load the second boot firmware. After a backup of the initial first and second boot firmwares, the processor can conduct a reboot. Upon startup, the processor can load the updated first boot firmware or updated boot loader with the set of cryptographic parameters and the boot firmware public keys. The processor can load the updated second boot firmware with at least one operating set of cryptographic parameters and a supporting digital signature which can be verified by a boot firmware public key for the updated first boot firmware or updated boot loader. The updated first boot firmware can verify the digital signature over the updated second boot firmware using the operating cryptographic parameters and the boot firmware public key for the operating set of cryptographic parameters.

After a successful verification of the digital signature by the updated first boot firmware, the processor can operate the updated second boot firmware. The updated second boot firmware can include support for cryptographic algorithms and certificates used by subsequent boot firmware. Upon conclusion of a secure boot process for the device, the device can operate with an operating system and device programs. The device can collect data from sensors and communicate with a network. By using the steps above, the computing device can securely and efficiently update a boot loader to support a new public key and new cryptographic algorithms. Subsequent boot firmware loaded by the updated boot loader, such as the updated second boot firmware, can support a digital signature using the new cryptographic algorithms which can be verified by the updated boot loader using the new public key. In this manner, the needs in the art identified above, including the transition of the use by a boot loader from classical cryptography (e.g. ECC and RSA) to post-quantum cryptography.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1c is an illustration of an exemplary set of cryptographic parameters for an initial first boot firmware and an updated first boot firmware, in accordance with exemplary embodiments;

DETAILED DESCRIPTION OF EXEMPLARY EMBODIMENTS OF THE INVENTION

FIG. 1a

Figure 1A:
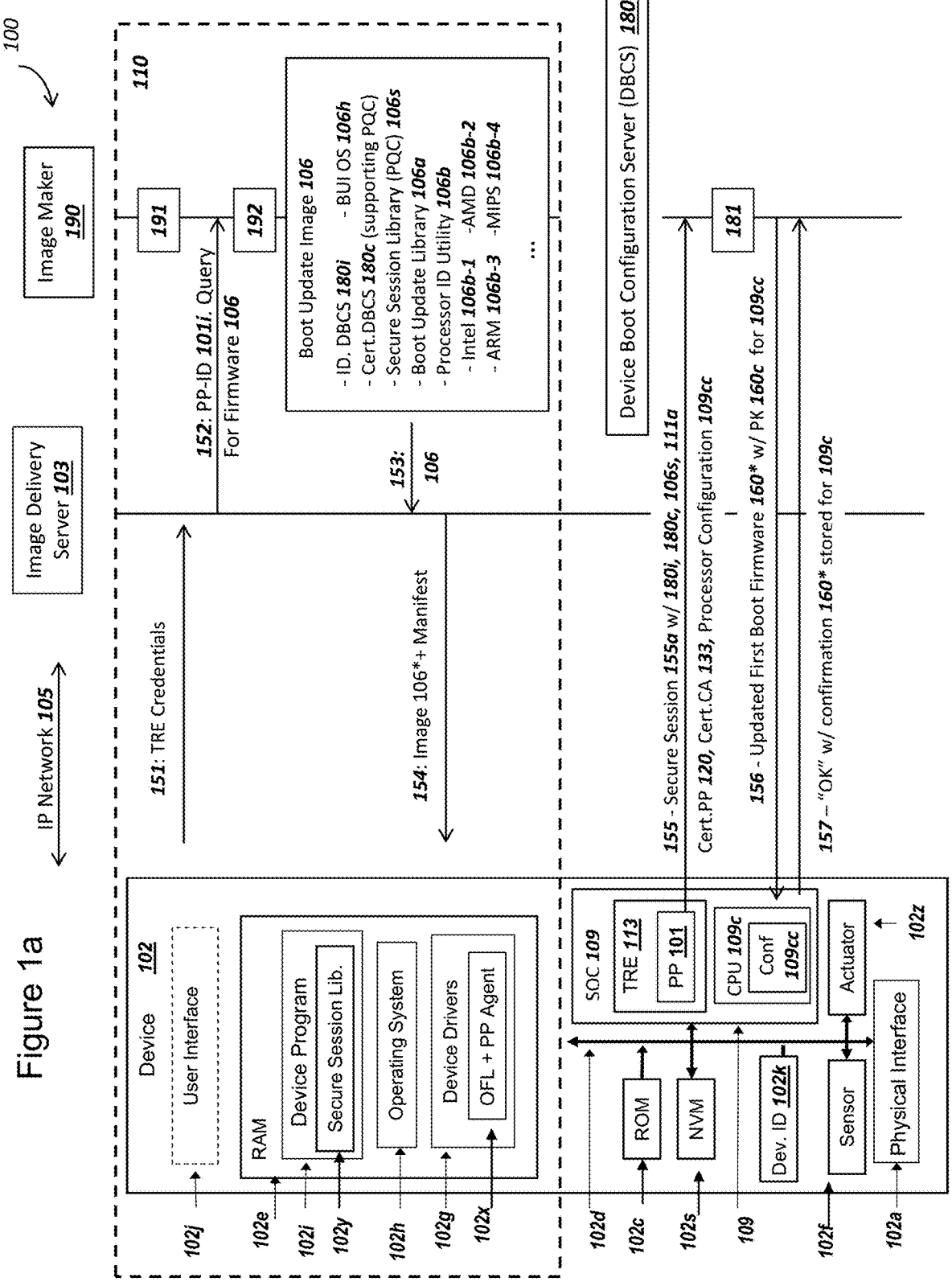
FIG. 1a is a graphical illustration of a system for a device (i) to securely receive a boot update image, and (ii) use the boot update image to receive an updated first boot firmware, in accordance with exemplary embodiments.

FIG. 1a is a graphical illustration of a system for a device (i) to securely receive a boot update image, and (ii) use the boot update image to receive an updated boot loader, in accordance with exemplary embodiments. System 100 can include a device 102 with a primary platform (PP) 101, an image delivery server 103, an image maker 190, an IP network 105, and a device boot configuration server (DBCS) 180. The device 102 can securely communicate over an Internet Protocol (IP) network 105 with image delivery server 103 and the DBCS 180. Image delivery server 103 can be referred to herein as server 103. The device boot configuration server can be referred to herein as server 180. Although a single server 103, single server 180, and a single device 102 are depicted in FIG. 1a, a system 100 can comprise a plurality of servers 103, server 180, and devices 102. In addition, although a single server 103 and 180 are depicted in FIG. 1a, the exemplary servers 103 and 180 shown for system 100 can comprise either different physical computers such as rack-mounted servers, or different logical or virtual servers or instances operating in a "cloud" configuration, including different computing processes which are geographically dispersed.

Server 103 or server 180 could also represent different logical "server-side" processes within a network, including different programs running on a server that listen and communicate using different IP port numbers within one physical server. In exemplary embodiments, server 103 and server 180 can operate using the physical electrical components similar to those depicted and described for a device 102 in FIG. 1a. Sever 103 and server 180 can use electrical components with larger capacities and larger overall power consumption, compared to the capacity and power consumption for the equivalent electrical components in a device 102. Other possibilities exist as well for the physical embodiment of server 103 or server 180 without departing from the scope of the present disclosure. In exemplary embodiments, a Secondary Platform Bundle Manager (SPBM) as described in the ETSI SSP Requirements document could operate an Image Delivery Server 103 and DBCS 180.

IP network 105 could be either a Local Area Network (LAN) or a Wide Area Network (WAN), or potentially a combination of both. IP network 105 could include data links supporting either IEEE 802.11 (WiFi) standards. Device 102 could also utilize a variety of WAN wireless technologies to communicate data with server 103 and server 180, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, 5G networks, and other examples exist as well. Server 103 and server 180 can connect to the IP network 105 via a wired connection such as, but not limited to, an Ethernet, a fiber optic, or a Universal Serial Bus (USB) connection (not shown). IP network 105 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 105 could utilize globally routable IP addresses and also comprise an insecure network.

Image maker 199 can comprise the source of a boot update firmware image 106 for a primary platform 101 operating in device 102. The boot update firmware image 106 as contemplated herein may also be referred to as a "generic" firmware image, "image 106", and also "firmware 106". In other words, a boot update firmware image 106 can support a plurality of different devices 102 with different PP 101 and also different central processing units 109c. The subsequent secure receipt of an updated first boot firmware 160* from DBCS 180 after download and receipt of the image 106 can be useful to address the multiple needs in the art described above. As contemplated herein, the term "first boot firmware" can comprise a boot loader for device 102, and the term "updated first boot firmware" can comprise an updated boot loader for device 102. The operation of firmware 106 as a secondary platform bundle for a particular device 102 with TRE 113 and PP 101 can support the secure update of an initial first boot firmware 160 with an updated first boot firmware 160*, where the updated first boot firmware 160* can support new cryptographic algorithms, parameters, and public keys to verify digital signatures for an updated second boot firmware 161* as depicted and described in connection with FIG. 1b below.

In exemplary embodiments, the first boot firmware 160* can comprise a boot firmware for processor 190c in device 102 or a secure boot pre-loader. As contemplated herein, the first boot firmware 160 can comprise an initial boot loader, and the first boot firmware 160* can comprise an updated boot loader. The first boot firmware 160* can comprise the series of machine executable instructions for a processor 190c that are specified for the processor 190c to begin executing at the lowest memory location of a read-only memory for processor 190c to begin executing upon power up, such as a memory address of 0x00000000 or 0xFFFF0000, although other possibilities exist as well. In summary, the first boot firmware 160* can comprise a initial firmware or boot loader that processor 190c loads and operates with in order to subsequently load a second boot firmware 161* (shown in FIG. 1b below), where the first boot firmware 160* includes a public key, cryptographic algorithms, and cryptographic parameters to verify a digital signature using the public key for the second boot firmware 161*. For some embodiments, the first boot firmware 160* could comprise the boot firmware loaded by a boot loader, where the boot loader may not include the public key, but the first boot firmware 160* loaded by the boot loader could (i) include the public key and (ii) verify a digital signature for the next boot firmware which could comprise the second boot firmware 161*.

Although a single image maker 190 is depicted in FIG. 1a, a system 100 could include a plurality of different image makers 190, and a server 103 could select an image maker 199 based on data received from device 102, such as using the primary platform identity PP-ID 101i for TRE 113 and PP 101 in device 102. In exemplary embodiments, the primary platform identity PP-ID 101i can be associated with a CPU 109c, such that the type of CPU 109c (and processor parameters necessary to delivery an updated boot firmware 160*) can be determined from the PP-ID 101i.

Many possibilities exist for the source and operation of a firmware 106 from an image maker 190 without departing from the scope of the present disclosure. A first image maker 199 could create a first firmware 106 which supports a first class of devices 102 and SOC 109 with CPU 109c and/or PP 101, and a second image maker 199 could create a second firmware 106 which supports a second class of devices 102 with a different CPU 109c and/or PP 101. Or, as depicted in FIG. 1a, a third image maker 199 could create a firmware 106 that supports a wide variety of PP 101 and devices 102 through a processor ID utility 106b. Or, the third image maker 199 could create both the first and second firmwares 106. A plaintext boot update firmware 106 can provide machine executable instructions and cryptographic data such as algorithms and keys for a TRE 113 to conduct secure cryptographic operations for device 102 after the load and operation of the firmware 106 by the PP 101 (such as the secure cryptographic operations used to receive boot firmware 160* depicted and described in connection with FIG. 1a and figures below).

Device 102 can be a computing device for sending and receiving data, including a wireless device. Device 102 can take several different embodiments, such as a general purpose personal computer, a mobile phone based on the Android® from Google® or the IOS operating system from Apple®, a tablet, a device with a sensor or actuator for the "Internet of Things", a module for "machine to machine" communications, a device that connects to a wireless or wired Local Area Network (LAN), and other possibilities exist as well without departing from the scope of the present disclosure. Device 102 can also be a computing device according to GSMA technical document "iUICC POC Group Primary Platform requirements", Approved Release 1.0 dated May 17, 2017, which is hereby incorporated by reference in its entirety ("GSMA PP Requirements"). Device 102 can comprise a device such as that depicted in FIG. 6 on page 24 of the GSMA PP Requirements. Exemplary electrical components within a device 102 are depicted and described in FIG. 1a. Other possibilities exist as well for the physical embodiment of device 102 without departing from the scope of the present disclosure. As a few examples, device 102 can also comprise a networked router, a physical server, a home appliance, an automobile or other transportation equipment connected to IP network 107.

Device 102 in FIG. 1a is illustrated to include many components that can be common within a device 102, and device 102 may also operate in a wireless configuration in order to connect with a wireless network. In a wireless configuration, the physical interface 102a of device 102 may support radio-frequency (RF) communications with networks including a wireless network via standards such as GSM, UMTS, mobile WiMax, CDMA, LTE, LTE Advanced, 5G, and/or other mobile-network technologies. In a wireless configuration, the physical interface 102a may also provide connectivity to local networks such as 802.11 WLAN, Bluetooth, Zigbee, or an IEEE 802.15.4 network, among other possibilities. In a wireless configuration, device 102 could use a physical interface 102a connected with both a wireless WAN and wireless LAN simultaneously. In a wired configuration, the physical interface 102a can provide connectivity to a wired network such as through an Ethernet connection or USB connection.

The physical interface 102a can include associated hardware to provide connections to components such as radio-frequency (RF) chipsets, a power amplifier, an antenna, cable connectors, RF filters, etc. Device drivers 102g can communicate with the physical interfaces 102a, providing hardware access to higher-level functions on device 102. Device drivers 102g may also be embedded into hardware or combined with the physical interfaces. Device drivers 102g can include an Open Firmware Loader (OFL) and Primary Platform (PP) agent 102x, which can be utilized by a device 102 and operating system 102h in order to read and write data to TRE 113 via external pads 109a and bus 109d (shown in FIG. 1b below), including communicating with a primary platform 101 within TRE 113. Device 102 may preferably include an operating system 102h to manage device drivers 102g and hardware resources within device 102. The operating systems described herein can also manage other resources such as memory and may support multiple software programs or software libraries operating on device 102, including applications that communicate with PP 101 through a device driver 102g, such as agent 102x The operating system 102h can include Internet protocol stacks such as a User Datagram Protocol (UDP) stack, Transmission Control Protocol (TCP) stack, a domain name system (DNS) stack, etc., and the operating system 102h may include timers and schedulers for managing the access of software to hardware resources, including TRE 113. The operating system shown of 102h can be appropriate for a low-power device with limited memory and CPU resources (compared to a server 103). Example operating systems 102h for a device 102 includes Linux, Android® from Google®, IoS from Apple®, Windows® Mobile, or Open AT® from Sierra Wireless®. Additional example operating systems 102h for device 102 include eCos, uC/OS, LiteOs, Contiki, OpenWRT, Raspbian, and other possibilities exist as well without departing from the scope of the present disclosure. Note that other operating systems for computing environments in a system 100 can include the functionality of OS 102h, such as the boot update image 106 including boot update OS 108h. Note that the ETSI SSP Requirements document also contemplates that a secondary platform bundle, such as boot update image 106 includes an operating system, such as the operation system for the SPB in FIG. 2.

A device program 102i may be an application programmed in a language such as, but not limited to, C, C++, Java, and/or Python, and could provide functionality to support M2M applications such as remote monitoring of sensors and remote activation of actuators. A device program 102i could also comprise an application for a mobile phone, table, personal computer, or the like. Device program 102i could also be a software routine, subroutine, linked library, or software device, according to one preferred embodiment. As contemplated herein, a device program 102i may be an application operating within a smartphone, such as an iPhone® or Android®-based smartphone, and in this case device 102 could comprise the smartphone. The application functioning as a device program 102i could be downloaded from an "app store" associated with the smartphone. Device program 102i can include secure session library 102y, which can provide the functionality or "System on a Chip" (SOC) 109 instructions for conducting secure sessions with servers or authenticating with a network using keys, certificates, and identities within the primary platform 101. Note that a boot update library 106a within a boot update image 106 can operate in an equivalent manner within TRE 113 as a device program 102i for device 102 (but with more restricted resources and fewer external interfaces for the TRE 113 and PP 101).

Many of the logical steps for operation of device 102 can be performed in software and hardware by various combinations of sensor 102f, actuator 102z, physical interface 102a, device driver 102g, operating system 102h, device program 102i, and SOC 109. Note that device 102 may also optionally include user interface 102j which may include one or more devices for receiving inputs and/or one or more devices for conveying outputs. User interfaces are known in the art for devices 102 and could include a few LED lights or LCD display or OLED display, and thus user interfaces are not described in detail here. User interface 102j could comprise a touch screen if device 102 operates as a smartphone or mobile phone. As illustrated in FIG. 1a, device 102 can optionally omit a user interface 102j, since no user input may be required for many M2M or "Internet of Things" applications, although a user interface 102j could be included with device 102. For embodiments with a user interface 102j, a user confirmation method 209a (described below in FIG. 2) can specify the required input and user interface 102j for boot update image 106 to verify with a user of device 102 that the first boot firmware 160 should be updated.

Device 102 may be a computing device or wireless device that includes computer components for the purposes of collecting data from a sensor 102f or triggering an action by an actuator 102y. Device 102 may include a central processing unit (CPU) within SOC 109 (such as processor cores 109c depicted and described in connection with FIG. 1b below), a random access memory (RAM) 102e, and a system bus 102d that couples various system components including the random access memory 102e to the processing unit 102b. The system bus 102d may be any of several types of bus structures including a memory bus or memory controller, a peripheral bus, and a local bus using any of a variety of bus architectures including a data bus.

Device 102 can include a SOC 109 and SOC 109 is also depicted and described in connection with FIG. 1b below. SOC 109 can include TRE 113, and additional details for the operation of SOC 109 and TRE 113 is provided in subsequent figures. Although TRE 113 is depicted in FIG. 1a as operating within SOC 109, TRE 113 could be operated within a removable unit such as an SD card, a SIM card, etc. Or TRE 113 could operate within a separate soldered chip or integrated circuit connected to bus 102d. An exemplary removable form factor for TRE 113 could comprise a standard SD card, a mini SD card, a micro SD card, a mini UICC, a micro UICC, or a nano UICC, and other possibilities exist as well without departing from the scope of the present disclosure. SOC 109 can include electrical contacts (such as external pads 109a depicted in FIG. 1b) which provide electrical connectivity to bus 102d.

SOC can include CPU 109c or processing cores 109c, where processing cores 109c can include configuration data 109cc. Processor configuration data 109cc can include a processor identity such as CPUID, an operating microcode version, datapaths such as 32 bit or 64 bit, supported instruction sets such as SSE versions, no execute bits, etc. In general, the configuration data 109cc can be sufficiently detailed for a server such as DBCS 180 to determine an updated first boot firmware or boot loader that would operate on SOC 109 with processing cores 109c.

SOC 109 can include NAND or NOR flash memory in order to record data when device 102 is not powered, and other nonvolatile memory technologies can be used in a storage unit as well without departing from the scope of the present disclosure. SOC 109 can be separately manufactured from device 102 and accessed and loaded with data before insertion into device 102. SOC 109 could also operate as an "embedded" unit, such that storage unit comprises an integrated circuit soldered to a circuit board in device 102, and in these embodiments SOC 109 can be fixed and not removable.

Figure 3:
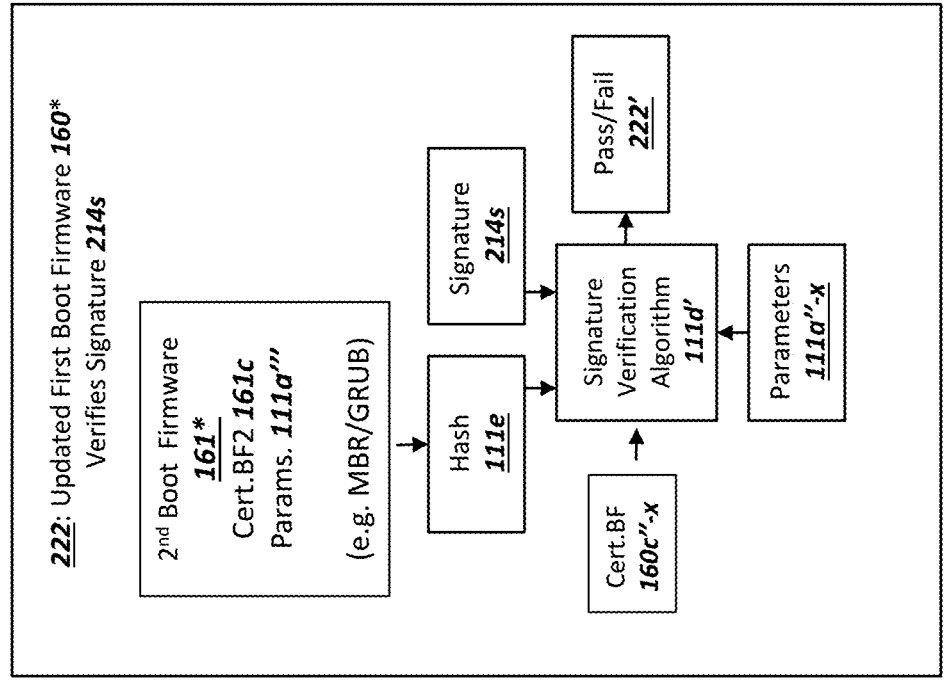
FIG. 3 is a flow chart illustrating exemplary steps for creating and verifying a digital signature using PKI keys, parameters, and data input, in accordance with exemplary embodiments.
Figure 3:
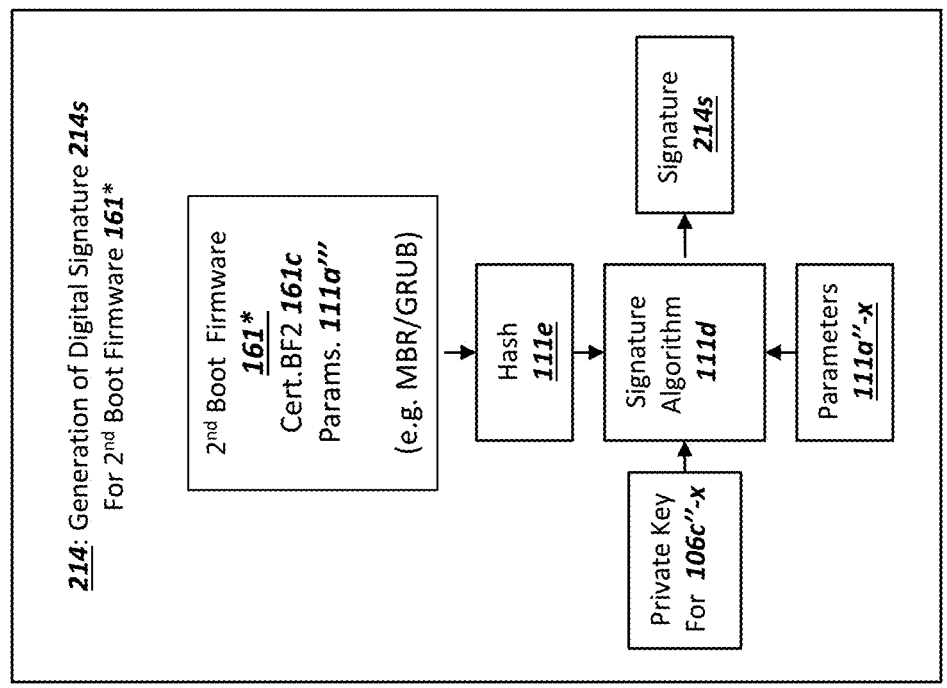

In exemplary embodiments, SOC 109 can include a TRE 113, and additional details regarding the components and operation of a TRE 113 are depicted and described in additional figures below, including FIG. 1b. The inclusion of TRE 113 and the operation of TRE 113 with PP 101 in SOC 109 can add functionality for SOC 109 that is not normally included in commercially available SOC in the market as of 2019, such as with the operation of a boot update firmware 106 in PP 101 to update the first boot firmware 160 as described herein. TRE 113 within SOC 109 can include a processor, bus, and memory similar (but with less power and on a smaller scale) as a separate processing core operating within SOC 109, bus 102d, and ROM 102c. TRE 113 can perform cryptographic functions using either PP boot firmware 121 in FIG. 1b or downloaded firmware 106 such processing and verifying digital signatures using cryptographic algorithms, parameters, and PKI keys, where the exemplary processing of digital signatures is depicted in FIG. 3.

Tamper resistant element (TRE) 113 can comprise a tamper resistant element as described in the GSMA PP Requirements document. TRE 113 can also comprise the secure element as described in the ETSI SSP Requirements document. Tamper resistant element 113 can comprise a silicon enclave within a tamper resistant chip such as a "system on chip" as depicted and described in connection with FIG. 1b below. TRE 113 can include a primary platform (PP) 101, where a primary platform is also described in both the GSMA PP Requirements document and the SSP Requirements document. TRE 113 could also comprise a "Smart Secure Platform" (SSP) as described in the SSP Requirements document, such as the SSP depicted in FIG. 2 of the "Architecture" section 9.2.1. Note that draft specifications for an SSP such as "103 666-2 iSSP Draft Specification 0.14.0" are not published and have restricted access on the ETSI web site as of Oct. 30, 2019. Primary platform 101 can comprise a secure operating environment, a secure enclave, a secure element, and include a dedicated processing core within a processor for device 102. Primary platform 101 can also operate in a Trusted Execution Environment (TEE) within a processor for device 102. Primary platform 101 can also comprise a SSP as contemplated by ETSI documents and draft specifications for 5G networks. Exemplary components for a TRE 113 and PP 101 for a device 102 are also depicted and described in connection with FIG. 1b below.

TRE 113 and PP 101 can support a variety of applications. TRE 113 can comprise the physical device such as that depicted in FIG. 1a and FIG. 1b below, and a primary platform 101 can comprise a secure processing environment operating within the TRE 113. With appropriate configured secondary platform bundle or firmware 106, TRE 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 102, a virtual key for cars or door locks, an secure environment for recording an identity and secret or private keys for drivers licenses, passports, online or website access, etc. Other applications for firmware 106 operating in TRE 113 and PP 101 are possible as well, without departing from the scope of the present disclosure. In general, cryptographic keys and cryptographic algorithms and parameters could be stored in PP 101 in order to securely support applications such as device programs operating on device 102. In this manner, an insecure device program also operating on device 102 would not feasibly be able to ready the cryptographic keys or use the cryptographic algorithms stored in PP 101.

Thus, a TRE with a PP 101 could support multiple different secondary platform bundles (SPB) operating in a device 102 over the lifetime of device 102, and the firmware 106 as contemplated herein can comprise one of the SPB in order to securely update the first boot firmware for device 102. Each of the above exemplary applications can be supported by a secondary platform bundles such as firmware 106 running or operating within TRE 113 on PP 101. Although a single firmware 106 is depicted and described in connection with FIG. 1a and FIG. 1b below, a TRE 113 and PP 101 can operate a plurality of different secondary platform bundles over time. As contemplated herein, the operation of a secondary platform bundle by a primary platform can also be referred to as a secondary platform. In other words, the secondary platform bundle can comprise the machine executable instructions for the primary platform to operate, and the secondary platform can comprise a running computing process in the primary platform of the instructions in the secondary platform bundle. Thus, a secondary platform bundle can be referred to herein as a secondary platform.

Each SPB can operate within a virtual machine for a processor 113b (in FIG. 1b) for TRE 113 and PP 101. As one exemplary embodiment, SPB such as firmware 106 can comprise a JAVA applet running on a Java virtual machine in TRE 113, where the JAVA virtual machine can be recorded in secure boot firmware 121 for TRE 113 and PP 101 (shown in FIG. 1b below). Different SPB operating within TRE 113 can be isolated from each other by conventional technology for processing hosts and/or virtual machines including prevention SPB from accessing the same memory for TRE 113. Other possibilities exist as well for a TRE 113 and PP 101 to operate as a host for an application such as boot update library 106a within firmware 106 operating as a SPB.

Although the exemplary environment described herein employs ROM 102c, RAM 102e, and nonvolatile memory (NVM) 102s, it should be appreciated by those skilled in the art that TRE 113 could also operate within other types of computer readable media which can store data that is accessible by a device 102, such as memory cards, subscriber identity device (SIM) cards, local miniaturized hard disks or solid state drives, and the like, which may also be used in the exemplary operating environment of system 100 without departing from the scope of the disclosure.

The memory and associated hardware illustrated in FIG. 1a provide nonvolatile storage of computer-executable instructions, data structures, program devices, device program 102i, device drivers 102g, and other data for computer or device 102. Note the device 102 may include a physical data connection at the physical interface 102a such as a miniaturized universal serial bus adapter, firewire, optical, or other another port and the computer executable instructions such as device program 102i, operating system 102h, or device driver 102g can be initially loaded into memory such as ROM 102c or NVM 102s through the physical interface 102a before device 102 is given to an end user, shipped by a manufacturer to a distribution channel, or installed by a technician.

A number of program devices may be stored in RAM 102e, ROM 102c, or NVM 102s, including an operating system 102h, device driver 102g, an http client (not shown), a DNS client, and related software. TRE 113 can record program devices as well, where the program devices in TRE 113 may be focused on cryptographic operations and functions conducted within TRE 113 in support of the operation of device 102. A firmware 106 depicted and described in connection with FIG. 1a and other figures herein can comprise a program device. Program devices include routines, sub-routines, programs, objects, components, data structures, etc., which perform particular tasks or implement particular abstract data types. Aspects of the present disclosure may be implemented in the form of (i) a device program 102i which are executed by the device 102 working in conjunction with (ii) a firmware 106 on TRE 113 and PP 101 to securely download an update boot firmware 160* for processor 109c (as depicted and described in connection with FIG. 2 below).

A user may enter commands and information into device 102 through an optional user interface 102j, such as a keypad, keyboard (possibly miniaturized for a mobile phone form-factor), and a pointing device. Pointing devices may include a trackball, an electronic pen, or a touch screen. A user interface 102j may also include a display (not shown) such as a device screen. A display may also be connected to system bus 102d via an interface. The display can comprise any type of display devices such as a liquid crystal display (LCD), a plasma display, and an organic light-emitting diode (OLED) display. Device 102 may also include a camera (not shown) connected to or integrated with device 102 through a physical interface 102a, and the camera can comprise a video camera for the device 102 to collect sensor data that includes video or images. The camera (not shown) can be a CCD (charge-coupled device) camera, a CMOS (complementary metal-oxide-semiconductor) camera, or a similar device to collect video or camera input including QR codes. Other arrangements could be used as well, without departing from the disclosure.

The device 102, comprising a computer, may operate in a networked environment using logical connections to one or more remote computers, such as servers. Servers communicating with device 102 can also function as a general purpose server to provide files, programs, disk storage, remote memory, and other resources to device 102 usually through a networked connection. Additional remote computers with which device 102 communicates may include another device 102 or mobile device, an M2M node within a capillary network, a personal computer, other servers, a client, a router, a network PC, a peer device, a wireless network, or other common network nodes. The servers or networks communicating with device 102 or a remote computer typically includes many of the elements described above relative to the device 102, including a CPU, memory, and physical interfaces. It will be appreciated that the network connections shown throughout the present disclosure are exemplary and other means of establishing a wireless or wired communications link may be used between mobile devices, computers, servers, corresponding nodes, and similar computers. The operation of a TRE 113 within device 102 with a firmware 106 can be utilized to (i) determine a processor configuration 109cc and (ii) establish secure communications with a DBCS 180, (iii) download an updated boot firmware 160*, and (iv) replace an initial boot firmware 160 for device 102 with the updated boot firmware 160*.

The (i) device program 102i operating within device 102 illustrated in FIG. 1a and communicating with TRE 113 through agent 102x or (ii) boot update firmware 106 can provide computer executable instructions to hardware such as SOC 109 through a system bus 102d or 109d in order for a device 102 to (i) transmit and receive data with a DBCS 180, and (ii) establish a secure session 155a with DBCS 180, thus allowing the server 180 to transfer an updated boot firmware 160* in an authenticated and encrypted manner. The device program 102i can enable the device 102 to authenticate and communicate with a server by (i) storing data in memory such as RAM 102e and (ii) transmitting the data through physical interface 102a, where the data can include, a destination IP address number, a packet or packet header value, an encryption or ciphering algorithm and key, a digital signature and public key, etc, where cryptographic operations or calculations for the secure session 155a can be performed by TRE 113 and Primary Platform 101 using the firmware 106 with Secure Session Library (PQC) 106s operating with PP 101.

The data recorded in RAM 102e can be subsequently read by the operating system 102h or the device driver 102g. The operating system 102h or the device driver 102g can write the data to a physical interface 102a using a system bus 102d in order to use a physical interface 102a to send data such as a digital signature for authentication to server 180 using the IP network 105. In exemplary embodiments, the digital signature can be generated or processed in the TRE 113 using a PP 101 and a primary platform private key SK.PP 115a (depicted in FIG. 1b). Alternatively, the device program 102i can write the data directly to the physical interface 102a using the system bus 102d. In general, digital signatures for authentication with a server 180 can be performed in TRE 113 by a PP 101 using firmware 106 and library 106s, where the digital signature output is transferred from TRE 113 to RAM 102e before being transmitted from device 102 to a server through the IP network 105. Note that device driver 102g can include OFL and PP agent 102x in order to communicate with TRE 113. Thus, OFL and PP agent 102x can be a device driver 102g specifically for TRE 113.

Conversely, in order for device 102 to receive a packet or response from server 180, which could include a challenge or nonce or random number in order to authenticate a device 102 with the server, the physical interface 102a can use a radio to receive the challenge or nonce from a wireless network. The challenge or nonce received from the server through the wireless network could comprise a random number or a pseudo random string of digits, bits, and/or characters. The received data can include information from a server and may also comprise a datagram, a source IP address number, a packet or header value, an instruction for device 102, an acknowledgement to a packet that device 102 sent, a digital signature, and/or encrypted data. The operating system 102h or device driver 102g can use a system bus 102d and a processing unit in SOC 109 to record the received data such as a challenge or nonce from a server in memory such as RAM 102e, and the device program 102i or operating system 102h may access the memory in order to process the received data and determine the next step for the device 102 after receiving the data.

Processing the received data from a server 180 to for TRE 113 could include (i) deciphering or decrypting received data by device 102 such as updated boot firmware 160 with a symmetric ciphering key derived by library 106s for firmware 106 in TRE 113 and PP 101, (ii) generating a digital signature for a challenge or nonce as described in the paragraph above, reading an instruction from a server, or similar transformations of the received data.

Moreover, those skilled in the art will appreciate that the present disclosure may be implemented in other computer system configurations, including hand-held devices, net-books, portable computers, multiprocessor systems, microprocessor based or programmable consumer electronics, network personal computers, minicomputers, mainframe computers, servers, and the like. The disclosure may also be practiced in distributed computing environments, where tasks are performed by remote processing devices that are linked through a communications network. In a distributed computing environment, program devices may be located in both local and remote memory storage devices. In addition, the terms "mobile node", "mobile station", "mobile device", "M2M device", "M2M device", "networked sensor", or "industrial controller" can be used to refer to device 102 as contemplated herein. Further, the device 102 could comprise a hardware server, a router, an Ethernet or fiber-optic switch, a set-top box for a cable modem or DSL modem, and other possibilities exist as well without departing from the scope of the present disclosure.

Although not depicted in FIG. 1a, a server shown above in FIG. 1a such as IDS server 103 or server 180 can include equivalent internal components as device 102 in order to operate. The server 103 and server 180 in FIG. 1a could include a processor similar to SOC 109, with primary differences for the processor server being increased speed, increased memory cache, an increased number and size of registers, the use of a 64 bits for datapath widths, integer sizes, and memory address widths, as opposed to an exemplary 32 bits for processor cores in SOC 109 or an exemplary 32 or 16 bits for a processor in TRE 113. Other possibilities exist as well for the size of datapath widths for a TRE 113 and processing core in device 102 without departing from the scope of the present disclosure. Similarly, RAM in a server could be a RAM similar to RAM 102e in device 102, except the RAM in a server could have more memory cells such as supporting exemplary values greater than an exemplary 16 gigabytes, while RAM in device 102 could support fewer memory cells such as less than an exemplary 8 gigabytes. Non-volatile memory for storage in a server 103 in FIG. 1a could comprise disks, "solid state drives" (SSDs) or "storage area networks" (SAN) for a server. For a physical interface 102a, in exemplary embodiments, a server 103 and server 180 in FIG. 1a could use a physical, wired LAN interface such as a high-speed Ethernet or fiber optic connection.

At step 191, image maker 190 generates or processes firmware 106 for primary platform 101 operating in TRE 113. Image maker 190 could create a common firmware 106 for a collection of devices 102 with TRE 113, such as a firmware 106 comprising a Java applet or Java application for (i) collecting processor 109c configuration 109cc and (ii) downloading an updated boot firmware 160* that supports the processor 109c configuration 109cc. Other applications for a secondary platform bundle 108 within a firmware 106 are possible as well. Firmware 106 could also be machine executable code, such as byte code, for other platforms as well and may also support other applications such as firmware for running or operating a "Smart Secure Platform" within TRE 113.

A step 191 can comprise compiling or assembling source code for firmware 106 into machine executable code. For some embodiments, the firmware 106 can comprise byte code that is operated by the PP 101 as a host or Java Virtual Machine. A first firmware 106 in a step 191 could be for a first processor type of CPU 113b and PP boot firmware 121 for a first class of device 102 (depicted in FIG. 1b below), and a second firmware 106 in a step 191 could be for a second processor type of CPU 113b and PP boot firmware 121 for second class of device 102, and other possibilities exist as well. Image maker 190 and IDS 103 could select the first or second image 106 (or other images) using identity information from PP 101 in a message 151, such as PP-ID 101i. In exemplary embodiments, image maker 190 can comprise a collection of servers, such that a first server processes the firmware 106 offline and encrypts the data of firmware 106 before storing the ciphertext firmware 106* in a second server for image maker 190, where the second server is connected to IP network 105 with IDS server 103. Thus the firmware transferred between image maker 190 and IDS 103 could comprise a ciphertext firmware 106*.

In exemplary embodiments, a boot update firmware image 106 generated by an image maker 190 can include a package of data with additional software and firmware for the primary platform 101 operating on a device 102. The boot update firmware image 106 can include (i) an identity of the device boot configuration server (DBCS) of ID. DBCS 180i, where the identity could comprise a domain name or IP address for IP network 105, (ii) a boot update image (BUI) operating system of BUI OS 106h, where the OS can be similar to the OS 102h for device 102 but with fewer resources, drivers, and interfaces supported, (iii) an X.509 certificate for the DBCS of cert.DBCS 180c where the certificate may support post-quantum computing standards, a Secure Session Library (PQC) 106s which can support the secure session 155a below and the secure session may also support post-quantum computing algorithms in a session such as TLS or DTLS, and other possibilities exist as well for the protocol of the secure session 155a supported by library 106s without departing from the scope of the present disclosure.

The boot update firmware image 106 can also include (iv) a boot update library 160a which can be used to write an updated first boot firmware 160* to the read only nonvolatile memory for processor 109c. In other words and in exemplary embodiments as depicted in FIG. 1b, a primary platform 101 operating with image 106 can write to a nonvolatile memory such as memory 109f in SOC 109 (depicted and described in FIG. 1b below), while the processor 190c can be prevented with a memory controller from writing to the nonvolatile memory. In this manner, security for a system 100 and device 102 can be increased, since only the TRE 113 can write to the nonvolatile memory used to record a first boot firmware 160 or 160* for the processor 109c.

In exemplary embodiments, the boot update image 106 can also include (v) a utility or routine for image 106 operating in PP 101 to detect, read, and forward the configuration 190cc for processor 109c within SOC 109. The utility or routine can comprise a Processor ID Utility 106b, which can both (i) query for or read the processor identity for processor 109c such as a CPUID as well as (ii) the configuration 190cc. As noted above, the configuration 190cc can include an operating microcode version, datapaths such as 32 bit or 64 bit, supported instruction sets such as SSE versions, no execute bits, etc. The configuration 190cc could also include the memory hardware address that processor 109c first accesses in order to start a boot process, and the boot update library 160s could use that address in order to write an updated first boot firmware 160*. The configuration 190cc read by a utility 106b can also include the size of the memory available for an updated first boot firmware 160*. In general, the configuration data 109cc can be sufficiently detailed for a server such as DBCS 180 to determine an updated first boot firmware 160* or boot loader that would successfully operate on SOC 109 with processing cores 109c.

The processor ID utility 106b can include routines, subprograms, or libraries for reading a processor configuration 109cc from a plurality of different processors 109c that may be commonly supported by device 102 and SOC 109. A processor ID utility can include sub-utilities for reading configuration 109cc from different families of processors such as utilities for Intel based processors of 106b-1, Advanced Micro Devices (AMD) 106b-2, ARM based processors of ARM 106b-3, MIPS based processors of 106b-4, and other processor families can be supported as well.

In some exemplary embodiments, the use of a utility 106b could be omitted, and a first firmware update image 106 could support the Intel family of processors with a single utility 106b for Intel processors, a second firmware update image 106b for ARM based processors, etc. An IDS 103 or image maker 109 could select the first or second firmware update image 106 using the primary platform identity PP-ID 101i, where a database or table accessible to IDS 109 or image maker 109 could select or determine the first or second firmware image 106 (or a plurality of different firmware images 106 for a plurality of different processors) using the PP-ID 101i. Or, other embodiments different identification data for SOC 109 could be send in TRE credentials 151 such as the CPUID, family of processor 109c, etc. in order IDS 103 to select a boot update firmware image 106 that supports the SOC 109. In other words, a system 100 could include a plurality of boot update firmware images 106 and the boot update firmware image 106 for SOC 109 could be selected from identification data for SOC received by IDS 103 or image maker 190 from device 102.

In exemplary embodiments, a boot update firmware image 106 can support distribution of a common image 106 to a plurality of different devices 102 without requiring unique identification values for each device 102 (such as a CPUID or PP-ID 101i) to be received by an image maker 190. In exemplary embodiments, the common image 106 could support a family or class of SOC 109 for device 109, such as a Qualcomm Snapdragon 875 processor, an Apple A15 processor, etc. In this manner, the distribution of image 106 can be flexible, and a single image 106 shared across a plurality of devices 102. For exemplary embodiments, the use of image 106 can support the transfer of a single image 106 to thousands or more different device 102 with different processors 109c operating within different SOC 109. Or, for other embodiments, a first firmware image 106 can be created for a first type or class of primary platform 101 and a second firmware image 106 can be created by image maker 190 in a step 191 for a second type or class of primary platform 101, and the selection of the first or second firmware image 106 by IDS 103 or image maker 190 can be based upon identification information of the PP 101 received in a message 151, such as PP-ID 101i.

Firmware 106 with a boot update firmware image 106 can provide machine executable instructions for a processor in PP 101 (such as processor 113b depicted and described in connection with FIG. 1b) to execute or run. Firmware 106 could comprise a collection of compiled software libraries and programming code for the operation of TRE 113 and PP 101. Firmware 106 could comprise a Java-based applet or Java application, where boot firmware of PP 101 establishes and operates a Java virtual machine such as, but not limited to JamVM or HaikuVM. Other platforms for virtualization and emulation of a computer system by PP 101 are possible as well, without departing from the scope of the present disclosure, where firmware 106 can be compiled or formatted to operate on PP 101 operating as a host for the virtualized computer system. In exemplary embodiments, firmware 106 can comprise an application where PP 101 operates as a process virtual machine or an application virtual machine. The environment in which firmware 106 operates can also be referred to as a managed runtime environment (MRE).

Firmware 106 can comprise compiled software or machine executable instructions for either (i) a processor or (ii) a virtual machine in PP 101, and may also be referred to herein as an "image". In other words, although (A) firmware may traditionally refer to machine executable programming instructions that provides low-level or hardware control over computing hardware, such as memory and physical interfaces, as contemplated herein, (B) "firmware" or a secondary platform bundle for an image 106 can comprise higher level software written for a virtual machine. In addition, the computing environment of a primary platform can require secure functions such as writing and reading cryptographic keys for a firmware 106 specially designated protected memory, and thus firmware 106 comprising high level software may include features similar to traditional firmware.

Further, firmware may be traditionally associated with machine executable instructions that are read from a read only memory, and firmware 106 comprising software that is loaded into primary platform 101 can have features after loading in PP 101 that are similar to traditional firmware, such as firmware 106 not being readily modified by an insecure processor in device 102 such as processor 109c. In any case, although "firmware 106" is described herein as firmware and the firmware can comprise a secondary platform bundle, "firmware 106" and a secondary platform bundle can comprise any collection of machine executable instructions for the functions described herein of a firmware 106 which can be loaded and operated by primary platform 101. Similarly, the GSMA PP Requirements document refers to the collection of machine executable code for a primary platform as "firmware".

The Boot Update Library 106a can comprise an SSP application. The Boot Update Library 106a can support the secure receipt of an updated first boot image 160* from a DBCS 180, where the updated first boot image 160* can support the processor 109c with the processor configuration 109cc. The Boot Update Library 106a can support writing of the updated first boot image 160* to the nonvolatile memory 109f (in FIG. 1b below) that is both (i) read only memory for processor 109c and (ii) writeable memory for PP 101 and TRE 113. The firmware image 106 can also include an operating system 105h for a secondary platform operating within a primary platform 101, where operating system 106h can be similar to operating system 102h for device 102 above, except OS 106h can have reduced functionality for the embedded system and secure element contemplated for a TRE 113. OS 106h can include a set of certificate authority or certificate issuer certificates, such as exemplary root certificates for certificate authorities in order to secure session library (PQC) 106s for the establishment of secure session 155a below. Other secure protocols besides TLS could be supported and defined within secure session library 106s.

IDS server 103 could receive a firmware 106 and from a secure channel with an image maker 180, which is also depicted in FIG. 6 of the GSMA PP Requirements document. The image maker could be a different server for the processing and creation of images for PP 101 than a server 103. Note that IDS server 103 could communicate with a plurality of different image makers, and the IDS server 103 could select or query for an image 106 for PP 101 using the PP-ID 101i received with TRE credentials 151.

In order to obtain firmware 106 from IDS 103, device 102 using agent 102x could generate a message 151 with TRE credentials for TRE 113. In exemplary embodiments, the message 151 with TRE credentials could support the TRE credentials as described in sections 2.2.3, and 2.3 of the GSMA PP Requirements document. TRE credentials in message 151 could include an identity for PP 101 of PP-ID 101i. Note that TRE credentials in message 151 can be encrypted using static and ephemeral PKI keys with ECDHE key exchanges from both TRE 113 and IDS 103, as also described in the GSMA PP Requirements document.

PP-ID 101i can comprise a string of digits or alphanumeric characters to uniquely globally identify PP 101. PP-ID 101i can allow an IDS server 103 to identify the PP 101 for receiving an encrypted firmware 106. In exemplary embodiments, PP-ID 101i can be similar to either (i) an integrated circuit card identity (ICCID) found on SIM cards or (ii) an embedded universal integrated circuit card (eUICC) identity of "EID", or (ii) a universal unique identifier (UUID). In exemplary embodiments, PP-ID 101i can be written to hardware in PP 101 and operate as a unique, long-term identity for PP-ID 101i. For some exemplary embodiments, PP-ID 101i can comprise a cryptographic hash such as an SHA-256 hash value of a primary platform static public key PK.PP 115b (depicted in FIG. 1b) based on a set of cryptographic parameters 111a, which could specify a secure hash algorithm to use over PK.PP 115b. For these embodiments, then PP-ID 101i can also potentially comprise multiple different reasonably unique values, depending on the hash algorithm specified in cryptographic parameters 111a (e.g. a first PP-ID 101i for a first hash algorithm and a second PP-ID 101i for a second hash algorithm). Other examples for an identity of a primary platform are possible as well without departing from the scope of the present disclosure. Note that a firmware 106 could also include an identity of boot update image (BUI) of a BUI.ID (not shown) and can comprise a value equivalent to the identity of a primary platform above (e.g. a ICCID, EID, or similar values). The BUI.ID can be used by firmware 106 for the establishment of a secure session 155a below.

The IDS server 103 could select or query for an image 106 for PP 101 using the PP-ID 101i received message 151. IDS 103 could send image maker 190 a message 152 in order to query or request the image 106 for device 102 using PP-ID 101i. Image maker 199 could send IDS 103 the image 106 for device 102 (or a plurality of devices 102) via a secure session in a message 153.

Although FIG. 1a depicts image maker 190 sending image 106 after IDS 103 receives TRE credentials in message 151, for some embodiments, an image maker 190 could send image 106 to IDS 103 before IDS receives data from device 102, such as after a step 191. IDS 103 could store and query for image 106 locally within IDS 103 or associated servers. Other possibilities exist for the source and selection of a firmware 106 without departing from the scope of the present disclosure. For some embodiments, IDS server 103 could receive and record plaintext firmware 106 and encrypt the firmware 106 into ciphertext firmware 106* using a mutually derived symmetric ciphering key from a key exchange. IDS 103 could send the ciphertext firmware 106* to device 102 in a message 154, where the message 154 can also include a manifest. The manifest can comprise the manifest as specified in the GP OFL document. The encryption and transmission of a firmware 106 from IDS 103 to device 102 with PP 101 could support the steps as depicted in the GP OFL document as well as the ETSI SSP Requirements document.

After the receipt of a ciphertext firmware 106*, device 102 with PP 101 can conduct the series of steps to decrypt the firmware 106* and read a plaintext firmware 106. The steps for decryption, as well as verification of access rights for the firmware 106 can support the steps specified in the GP OFL document. PP 101 can load and begin operating with the firmware 106 as a secondary platform bundle in order to establish a secure session 155a with DBCS 180 and securely download updated first boot firmware 160* from DBCS 180.

System 100 can also include a device boot configuration (DBCS) 180, where a DBCS 180 was also described above. DBCS can support the establishment of a secure session 155a with PP 101 using the loaded and operating boot update firmware 106. The loaded and operating boot update firmware 106 can comprise a secondary platform for the primary platform 101 in TRE 113. After loading of firmware 106 in PP 101, firmware 106 in PP 101 can use the processor identification utility 106b in order to read a processor configuration 109cc for processor 109c in SOC 109. Firmware 106 can request the establishment of a secure session 155a with DBCS using at least the identity of DBSC ID.DBCS 180i, the certificate for DBCS of cert.DBCS 180c, the secure session library 106s, and a set of parameters 111a from the cryptographic parameters 111 in FIG. 1c below. In exemplary embodiments, both firmware 106 and DBCS 180 support the selected set of cryptographic parameters 111a for the establishment for secure session 155a. A message 155 from device 102 and PP 101 can signal the establishment of secure session 155a.

The secure session could comprise a TLS or DTLS and may also support the use of post-quantum cryptography algorithms with lattice-based algorithms and keys, code-based algorithms and keys, multivariate based algorithms and keys, or Supersingular Elliptic Curve Isogeny based algorithms or keys. Or, secure session 155a could use conventional technology for security such as TLS version 1.3 and other possibilities exist as well. As a minimum, secure session 155a uses server authentication for DBCS 180 similar to conventional use of HTTPS with web browsing. For some embodiments, secure session 155a could also support mutual authentication of PP 101 using firmware 106 through the inclusion of a certificate for PP 101 of cert.PP 120 (depicted in FIG. 1b below) and a certificate authority certificate or root certificate of cert.CA 133 in the secure session 155a. Other protocols for a secure session 155a besides TLS and DTLS can be used as well, such as IPSec, a VPN, and secure shell (SSH). In general, the keys and certificates used in the establishment of secure session 155a can support the selected cryptographic parameters 111a. As depicted, the secure session 155a can include the transfer of the processor configuration 109cc from PP 101 through device 102 to DBCS 180, where firmware 106 with utility 106b could previously read processor configuration 109cc.

Processor configuration 109cc can include a processor identity of CPUID in order for DBCS 180 and associated servers to track which updated first boot firmware has been delivered to which device 102.

DBCS 180 can then conduct a step 181 in order to process or select an updated first boot firmware 160* or updated boot loader for device 102 and processor 109c. DBCS can use the processor configuration 109cc from a message 155. DBCS 180 could also communicate with other servers associated with device 102, such as servers for a device owner, device manufacturer, or a service provider or network supporting device 102 in order to select the updated first boot firmware 160*. In exemplary embodiments, DBCS 180 could query a server 201 depicted in FIG. 2 in order to obtain a set of parameters 111a" for the updated first boot firmware 160*, where the set of parameters 111a" support the digital signature and cryptographic algorithms of an updated second boot firmware 161* (depicted in FIG. 1b). Note that the set of parameters 111a" in FIG. 1c also includes a certificate or public key of cert.BF 160c for the updated first boot firmware 160* use with the parameters 111a" to verify digital signatures of a second boot firmware 161 or 161*. In other words, DBCS 180 in a step 181 could determine which second boot firmware 161* with a digital signature 214s (in FIG. 2 and FIG. 3 below) should be supported, and select the updated first boot firmware 160* or updated boot loader in order for the first boot firmware 160* to verify the digital signature 214a.

Other possibilities exist as well for a DBCS to select an updated first boot firmware 160* for device 102 and processor 109c in a step 181 without departing from the scope of the present invention. For some embodiments, the updated first boot firmware 160* can be selected in step 181 to support a different set of cryptographic parameters 111 such as the parameters 111a" for firmware 160* depicted and described in connection with FIG. 1c. For some embodiments a step 181 can comprise both (i) the addition of cryptographic parameters 111a for the set 111a" that support post-quantum cryptography and (ii) the deletion or removal of cryptographic parameters 111a' and public key of cert.BF 160c for the previously installed, initial boot firmware 160 or initial boot loader.

In this manner, a step 181 could also comprise the deprecation of either insecure parameters 111a' or a compromised public key for cert.BF 160c. As one example, devices deployed over the next few years (e.g. 2020-2023) may initially use public keys in cert.BF supporting ECC or RSA based algorithms, but quantum computers by 2025 to 2030 may feasibly break those public keys. Consequently, the selection of parameters 111a" supporting post-quantum cryptographic algorithms and public keys for cert.BF 160c for an updated first boot firmware image 160* could be conducted in a step 181, such as after post-quantum cryptographic algorithms are standardized (where the standardized algorithms are included in parameters 111a" and public key for cert.BF 160c).

In this manner, a system 100 can support the transition of an initial first boot firmware 160 or initial boot loader to an updated first firmware boot firmware 160* or updated boot loader secured against quantum computers. Without the use of an updated first boot firmware 160*, a device 102 may become insecure when quantum computers can feasibly solve the elliptic curve discrete logarithm problem or the integer factorization problem. For some embodiments, as step 181 can include the query and receipt of updated first boot firmware 160* supporting cryptographic parameters 111a" from (i) the manufacturer of processor 109c, or (ii) the source of an updated second boot firmware 161* used by device 102 (e.g. ARM, Intel, AMD, Microsoft, Apple, Debian, IBM, Red Hat, etc). For some exemplary embodiments, DBCS 180 or the owner or operator of DBCS 180 can derive a PKI key pair and (i) record the public key in cert.BF 160c and then (ii) subsequently sign an updated second boot firmware 161* for device 102 with the corresponding private key. In exemplary embodiments, at a step 181, DBCS 180 can store a plurality of different public keys cert.BF 160c for a specific set of cryptographic parameters 111a"-x (depicted in FIG. 1c, FIG. 2, and FIG. 3 below), such that the updated second boot firmware 161* can be signed by a plurality of different private keys corresponding to the public keys in the plurality of cert.BF 160c.

A DBCS 180 can then send device 102 and firmware 106 operating in PP 101 a message 156. The message 156 can be sent via the secure session 155a and include the selected updated first boot firmware 160* for the processor 109c with a processor configuration of 190cc. Thus, the firmware 160* can be sent in an authenticated and encrypted manner through IP network 105. Note that the firmware 160* (i) can be selected in the step 181 using the processor configuration 109cc and (ii) can include at least one public key 160c for a set of cryptographic parameters 111a" supported by the updated first boot firmware 160*.

The SOC 109 with PP 101 and boot update image 106 can receive the updated first boot firmware 160* from device 102 and message 156. The PP 101 and SOC 109 can conduct the steps depicted and described in connection with FIG. 2 in order to replace or update a previously installed initial first boot firmware 160 (or initial boot loader) for processor 109c with the updated first boot firmware 160* (or updated boot loader) from the message 156. Upon successful installation and storing of the updated first boot firmware 160* in processor 109c read only memory 109f (depicted in FIG. 1b below) which is also a writable memory for PP 101, PP 101 and firmware 106 can send DBCS 180 an "OK" message 157 confirming the updated first boot firmware 160* can be successfully installed. Or, if error conditions or failure occurs for the attempted storage of firmware 160* in device read memory 109f, then message 157 could include notification of the failure and an associated error code, such that DBCS 180 and device 102 could attempt a subsequent, second download of a firmware 160* that could correct the error code from a message 157.

Figure 2:
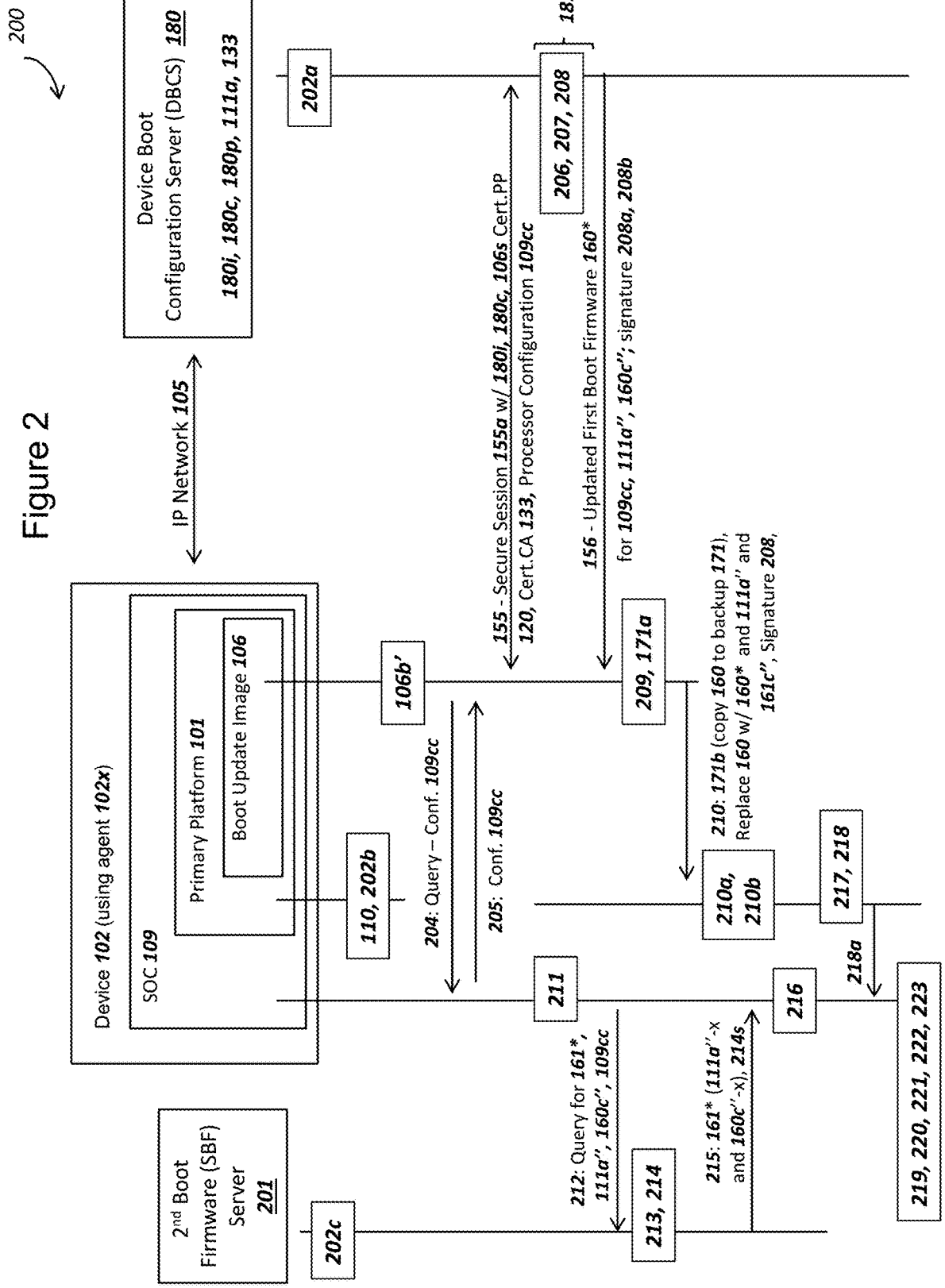
FIG. 2 is a simplified message flow diagram illustrating an exemplary system with exemplary data sent and received by (i) a device with a primary platform operating a boot update image, (ii) a device boot configuration server, and (iii) a second boot firmware server, in accordance with exemplary embodiments.

In exemplary embodiments, a device 102 can include the functional capabilities of (i) collecting sensor data from sensor 102f, (ii) changing state of an actuator 102z, (iii) communicating the data associated with a sensor or actuator with a wireless network, and/or receiving a challenge or nonce from a server and sending a digital signature. The secure operation of device 102 can depend upon the secure boot of device 102, which can require an updated first boot firmware 160* when cryptographic algorithms and keys for a previously installed initial first boot firmware 160* are deprecated (such as when quantum computers can feasibly break ECC and RSA based public keys). The device driver 102g, operating system 102i, and/or device program 102i could optionally be combined into an integrated system for providing the device 102 functionality. Other possibilities exist as well for the configuration or combination of components illustrated in FIG. 1a without departing from the scope of the present disclosure. In addition, the series of messages between device 102 sending message 151 with TRE credentials to server 103 and device 102 receiving encrypted firmware 106* from server 103 in a message 154 can comprise a step 110. The use of a step 110 is depicted in FIG. 2 below.

For some exemplary embodiments, the use of an image delivery server 103 and a primary platform 101 are not required for the use of a boot update image 106. As noted above, the boot update image 106 can also be referred to as a boot loader updater. A manufacturer, owner, or distributor of device 102 or SOC 109 could include the boot loader updater (operating equivalent to a boot update image 106) in nonvolatile memory in a TRE 113 in device 102 before the device 102 is distributed to an end user. The TRE 113 could operate boot update image 106 or boot loader updater in processor of TRE 113 that is separate or distinct from CPU 109c. For these embodiments, the boot update image 106 or boot loader updater could conduct the steps depicted in FIG. 2 below for the primary platform, but without requiring the use of a primary platform. In other words, a processor in TRE 113 could execute the instructions for boot update image 106 without a primary platform 101. For these embodiments, the TRE 113 and processor could conduct the steps contemplated herein as described for the primary platform.

FIG. 1b

Figure 1B:
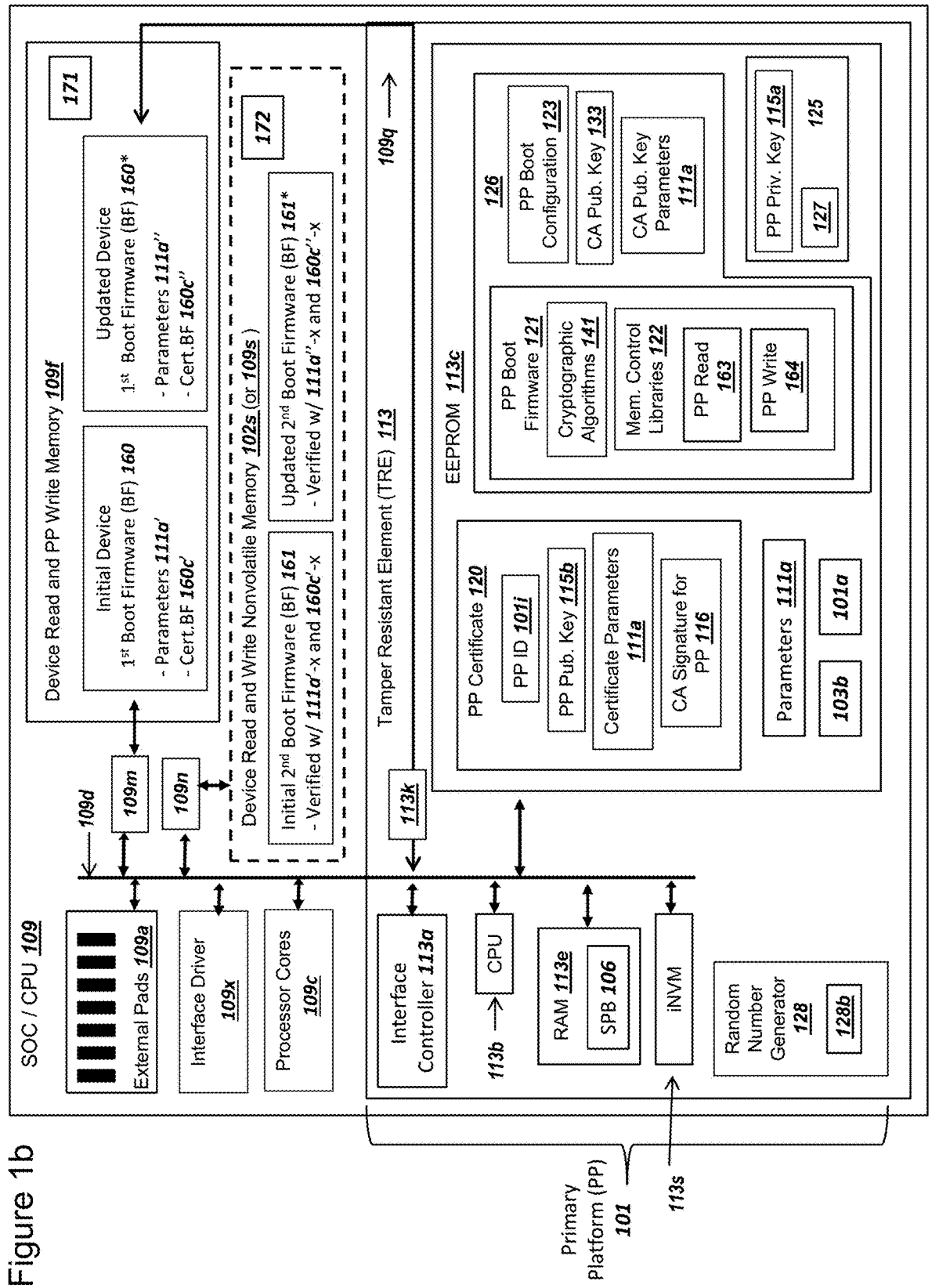
FIG. 1b is a graphical illustration of hardware, firmware, and software components for a device, including a tamper resistant element with a primary platform, in accordance with exemplary embodiments.

FIG. 1b is a graphical illustration of hardware, firmware, and software components for a device, including a tamper resistant element with a primary platform, in accordance with exemplary embodiments. FIG. 1b is illustrated to include several components that can be common within a "system on a chip" (SOC) 109 and a manufactured TRE 113 with a PP 101. In exemplary embodiments and as depicted in FIG. 1a above, device 102 can include and operate with the SOC 109, where SOC 109 can include a processor such as a central processing unit (CPU) or processor cores 109c.

Device 102 can include a manufactured SOC 109. SOC 109 can include separate components of external pads 109a, interface driver 109b, processor cores 109c, bus 109d, memory core interface 109m, nonvolatile memory 109s, and TRE 113. Although TRE 113 is depicted as operating in SOC 109, TRE 113 could also operate within a different component in device 102, such as physical interface 102a (in FIG. 1b above), where physical interface 102a could include a radio and a baseband processing unit. TRE 113 could also operate within a user interface 101j, and other possibilities exist as well without departing from the scope of the present disclosure, including TRE 113 operating as a "stand alone" module or chip soldered to a circuit board for device 102.

The external pads 109a of SOC 109 can provide an electrical interface for SOC 109 to connect with bus 102d of device 102, such that the internal components of device 102 can communicate with the internal components of SOC 109, using a device driver 102g, which could comprise OFL and PP agent 102x. The external pads 109a can include pins or electrical contacts for electrical input into SOC 109 and such as a power voltage, electrical ground, a clock input, and data lines to communicate binary data. The external pads 109a can support electrical output from SOC 109 as well. Although not separately depicted in FIG. 1b, a TRE 113 could also include electrical connectors similar to external pads 109a in order to transfer electrical signals from TRE 113 to SOC 109.

Interface driver 109b within SOC 109 can provide the firmware to support the selected physical bus type of both (i) bus 102d and internal bus 109d and (ii) a communications protocol for transferring data through the external pads 109a. The interface driver 109b can provide functionality similar to device driver 102g in FIG. 1a. For example, interface driver 109b could support multiple different bus types of a SPI bus, an I2C bus, a memory bus, and other possibilities exist as well for data transfer using the driver 109b between processing cores 109c and device 102 using bus 102d and other possibilities exist as well.

The processing cores 109c can comprise a general purpose processing cores appropriate for typically low power consumption requirements for a device 102 (compared to a server 103), and may also function as a microcontroller. The processing cores 101c can include at least one processor core for device 102 such as an ARM® based processor or an Intel® based processor such as belonging to the Atom or MIPS family of processors, and other possibilities exist as well including exemplary Cortex-M processors and cores. A single processor or processing core could operate for processing cores 109c as well. The processing cores 109c can also comprise specialized processing cores, such as including hardware based cryptographic accelerators, field-programmable gate arrays (FPGAs), and other possibilities exist as well without departing from the scope of the present disclosure. As contemplated herein, the processing cores 109 can be referred to as a first processor, and the first processor can include at least a primary core where the primary core reads a boot loader or a pre-boot loader from nonvolatile memory 109f.

Internal bus 109d can comprise at least one data bus to connect the internal components of SOC 109, including TRE 113. Internal bus 109d can be a bus similar to bus 102d for device 102 as depicted and described in connection with FIG. 1b above. Although internal bus 109d is depicted as extending into TRE 113, in exemplary embodiments two separate data buses could be utilized, and the two busses connected via electrical connections for TRE 113 similar to pads 109a, where TRE 113 manages the data flow between the two busses using an interface controller 113a.

SOC 109 can also include a memory core interface 109m, where memory core interface 109m provides processor 109c read only access to nonvolatile memory 109f. Note that TRE 113 can have at least write access to memory 109f (and possibly read and write access). In exemplary embodiments nonvolatile memory 109f can comprise a subset of general nonvolatile memory 109s for SOC 109, where memory 109f starts with a memory address first accessed by processor 109c upon power on, such as an exemplary memory address of 0x00000000. In other words, using a memory core interface 109m, processor 109c can only read from memory 109f and cannot write to the memory 109f. Memory 109f can appear to processor 109c as ROM memory such as ROM 102c for device 102 depicted and described above for device 102. However, the physical memory 109f could support write operations typical for NAND or NOR nonvolatile or flash memory, but physical memory 109f could only support the write operations through a memory interface 113k for TRE 113 as described below. In other words, memory 109f can only accept updates, writes, deletes, or changes originating from TRE 113, possibly through memory interface 113k. As contemplated herein, the combination of memory core interface 109m and memory interface 113k can be referred to as a memory interface for nonvolatile memory 109f, where the memory interface can include both the function of interface 109m and 113k.

As depicted in FIG. 1b, TRE 113 could access write functions to memory 109f via a bus 109q, which could be separate from a bus 109d and/or bus used by memory interface 109m to read data from memory 109f. Thus, in exemplary embodiments, a memory 109f with first boot firmware 160 or 160* (e.g. an initial boot loader for 160 and an updated boot loader for 160*) could be stored in memory where a first bus accessible to processor 109c reads the memory, but is also forbidden from writing to the memory. The memory 109f with first boot firmware 160 or 160* could be stored in memory where a second bus accessible to TRE 113 and PP 101 can write to the memory. Thus, a first bus could be used for reading from memory 109f and a second bus, distinct and separated from the first bus, could be used for writing to memory 109f.

As depicted in FIG. 1b, memory 109f can include the initial first boot firmware 160 or the updated first boot firmware 160*, which can comprise the first instructions read by processor 109c upon power up or reboot. In some exemplary embodiments, memory 109f could include a pre-boot loader or a boot loader for processor 109c that does not include a public key or digital signature verification of a second boot firmware. For these embodiments, the first boot firmware 160 or 160* can be the first boot firmware loaded by processor 109c that includes a public key and digital signature algorithms for verifying following boot firmware. In some exemplary embodiments, the first boot firmware 160 or 160* can comprise a BIOS ("basic input/output system"). The initial first boot firmware 160 can comprise the first boot firmware for processor 109c before the receipt and installation of updated first boot firmware 160* by device 102 from DBCS 180 via secure session 155a. The first boot firmware 160 or 160* could comprise a boot loader or a preboot loader, or may also be a BIOS for personal computers or servers. A read only memory for processor 109c could include a backup first boot image 171. If any of (i) a device 102 boot of first boot firmware 160 or 160* through (ii) a second boot firmware 161 and 161* and through (iii) additional boot firmware or software up to the loading of an OS 102h fails, hangs, or otherwise encounters unrecoverable errors, then processor 109c and conduct a reboot and start with loading the backup first boot image 171 instead of the first boot image 160 or 160*.

If the replacing of the initial first boot image 160 with the updated first boot image 160* fails (such as power being removed in the middle of writing 160* to memory 109f or with other errors), then processor could recover from a failure of a boot of 160* by rebooting with the backup first boot firmware 171. In exemplary embodiments, a reboot with the backup first boot firmware can specify the use of a backup second boot firmware 172. In other words, when a backup first boot firmware is used by a processor 109c, then upon conclusion of loading the backup first boot firmware 171 the processor can begin loading and operating with the backup second boot firmware 171 instead of the initial second boot firmware 161.

The first boot firmware 160 or 160* can support a set of cryptographic parameters 111a' or 111a", respectively and as depicted in FIG. 1b. In other words, the initial first boot firmware 160 can support parameters 111a' and the updated first boot firmware 160* can support parameters 111a". The parameters 111a' can be a first subset of cryptographic parameters 111 and the parameters 111a" can be a second subset of cryptographic parameters 111. Cryptographic parameters and the corresponding subsets 111a' and 111a" are depicted and describe in connection with FIG. 1c below. In summary cryptographic parameter can specify cryptographic algorithms and keys to use for the generation and verification of digital signatures. A boot firmware 160 and 160* can include the cryptographic algorithms to support the selected cryptographic parameters 111 such as 111a' or 111a".

The first boot firmware 160 or 160* can support a set of public keys as a certificate for boot firmware 160 as cert.BF 160c' or 160c", respectively, and as depicted in FIG. 1b. Although depicted as "cert.BF" the value could comprise simply a raw public key or set of raw public keys without X.509 certificates. Thus the term "public key" can be interchangeable herein for the term certificate in the context of public keys or certificates cert stored within a first boot firmware 160 or 160*. A first boot firmware 160 or 160* could store and support a plurality of public keys 160c' or 160c", respectively, for a set of cryptographic parameters 111a', in order to verify digital signatures for second boot firmware 161 or 161*, where the digital signature for the second boot firmware 161 or 161* was generated with a private key corresponding to a public key in either 160c' or 160c". The use of a public key for 160c" to verify a digital signature for second boot firmware 161* is also depicted and described in connection with FIG. 3 and FIG. 2 below.

A general nonvolatile memory 102s within device 102 connected to bus 102d or a general nonvolatile memory 109s within SOC 109 and connected to bus 109d could store an initial second boot firmware 161 or an updated second boot firmware 161*. A second boot firmware 161 or 161* could comprise a master boot record or an EFI (Extensible Firmware Interface) system partition (ESP) in support of the Unified Extensible Firmware Interface (UEFI). As depicted and described in connection with FIG. 2 and FIG. 3 below, the second boot firmware could include a digital signature which can be verified using public key 160c" and parameters 111a". Public key 160c could comprise multiple public keys 160c" and parameters 111a" could comprise multiple parameters, so a specific, designated selection of the public key 160c and could comprise public key 160c"-x and parameters 111a"-x as depicted in FIG. 1b, FIG. 2, and FIG. 3 below. Note that the nonvolatile memory storing the second boot firmware 161 or 161* can also have a backup second boot firmware 172, where the backup second boot firmware 172 can be selected and used by processor 109c if a boot process using (i) firmware 160 and then 161 fails or (ii) firmware 160* and then 161* fails.

In other words, a digital signature for second boot firmware 161 can be created (by a server such as server 203) and verified (by updated first boot firmware 160*) using the specified values of public key 160c"-x and parameters 111a"-x, which could be recorded or stored in the second boot firmware 161 or 161*. Note that general nonvolatile memory 102s or 109s with second boot firmware 161 or 161* can be written by device 102 and processor 109c, such that processor 109c and OS 102h can directly update the second boot firmware 161. The first boot firmware 160 or 160* would only load and process the second boot firmware 161 if it contains a digital signature that can be verified using public key 160c"-x. Thus, a secure system for device 102 can allow the device to update and store second boot firmware 161, which increases the flexibility of a device 102 for upgrades over time. A noted above in needs in the art, a device such as industrial equipment may have a lifetime greater than a decade and firmware or software upgrades for the device during that time may be required in order to maintain security, including the patching of bugs or errors in the Common Vulnerabilities and Exposures (CVE) database.

RAM memory within SOC 109 and external to TRE 113 is not shown in FIG. 1b, but RAM memory similar to RAM 102e for device 102 could be included in SOC 109 and connected via internal bus 109d. Processor 109c and/or TRE 113 can read data from physical memory such as 109f by writing an address of a memory page and/or block to memory core interface 109m, and memory core interface 109m returns the data from the page in physical nonvolatile memory 109s, and other possibilities exist as well. As one example, memory core interface 109m can deny processor 109c write operations on memory interface 109m where the address requested by processor 109c includes addresses reserved for first boot firmware 160 or 160*.

Similarly, processor 113b for TRE 113 can write data to physical memory 109f by writing an address of a memory block and/or page to memory core interface 113k plus the data to be recorded in physical memory (e.g. updated first boot firmware 160*), and memory core interface 113k can subsequently write the data to physical memory at the block and page address specified. As depicted in FIG. 1b, memory interface 113k could use a separate bus 109q for writing data to memory 109f. However, in some embodiments memory interface 113k and 109m could access memory 109f through the same memory bus. In some embodiments, the function of memory interface 113k could be combined with memory interface 109m, such that (i) processor 109c can read from memory 109f, (ii) processor 109c cannot write to memory 109f, and (iii) TRE 113 can at least write to memory 109f (and may also read from memory 109f).

Other possibilities exist as well for the use of a memory core interface 113k for TRE 113 without departing from the scope of the present disclosure. In exemplary embodiments, individual cells within a page can be addressed by a memory core interface 109m and 113k as well, and other possibilities for the structure and naming conventions of memory are possible without departing from the scope of the present disclosure. The memory core interfaces 109m and 113k can also be described as "memory interfaces" or also a "memory controller". In some embodiments, the function of memory interfaces 109m and 113k can be combined, such that a single memory interface to memory 109f both (i) allows write operations from TRE 113 with primary platform 101 and (ii) denies write operations but allows read operations to processor 109c.

Physical nonvolatile memory 109s can comprise memory similar or equivalent to nonvolatile memory 102s as depicted and described for device 102 above in FIG. 1a. Data recorded in memory 109s can remain stored in SOC 109 when power is removed from SOC 109. Although memory 109s is depicted as located within SOC 109, (X) some memory cells recording data for SOC 109 could be located outside the physical housing of SOC 109 and/or TRE 113 and (Y) other memory cells recording data for SOC 109 could be located inside the physical housing of SOC 109. TRE 113 and processor cores 109c could access the physical nonvolatile memory 109s via a bus 109d and a memory controller 109n. In some exemplary embodiments, a memory controller 109m could operate with physical non-volatile memory both (i) inside SOC 109 and (ii) outside SOC 109 and within device 102.

As one example of physical separation of memory 109f, the physical memory in SOC 109 comprising non-volatile memory 109f could have a portion of the physical addresses reserved for reading and writing by TRE 113 only (where processor 109c can read only), such as an exemplary top 50 blocks of non-volatile memory 109f. Memory controller 109m could intentionally disallow the writing of data to non-volatile memory 109f by (i) processors 109c or (ii) other components within SOC 109 or (iii) device 102 except for TRE 113, where the block address is in the exemplary top 50 blocks. Memory controller 109m could also operate on a lower level than a block address for non-volatile memory 109f as well, such as only allowing TRE 113 or processor 113*b* to allow a specified range of pages within non-volatile memory 109*f* for writing, where the specified range of pages could include the first boot firmware 160 or 160*.

SOC 109 or device 102 can include tamper resistant element (TRE 113). TRE 113 can also be referred to as a "secure element", "secure enclave", "secure environment", or also a trusted execution environment (TEE) or smart secure platform (SSP). As depicted in FIG. 1*b*, TRE 113 can comprise the physical hardware with components consisting of at least an interface controller 113*a*, a CPU 113*b*, memory controller 113*k*, RAM 113*e*, internal nonvolatile memory (iNVM) 113*s*, an internal bus 109*d* which could be segmented and a distinct subset of a bus 109*d* that is external to TRE 113 and internal to SOC 109, a hardware-based random number generator 128, a transducer 113*z*, and an Electrically Erasable Programmable Read-Only Memory (EEPROM) 113*c*. The connection of the subset of bus 109*d* inside TRE 113 and the external portion of bus 109*d* within SOC 109 could be managed by interface controller 113*a*.

TRE 113 can include a primary platform identity PP-ID 101*i*. PP-ID 101*i* could comprise a preferably unique alpha-numeric or hexadecimal identifier for PP 101, such as a universal unique identifier (UUID), an International Mobile Equipment Identity (IMEI), an owner interface identifier in an IPv6 network, a serial number, or other sequence of digits to uniquely identify each of the many different possible units for PP 101 in a system 100 and other systems herein. PP-ID 101*i* can preferably be recorded in a non-volatile memory or written directly to hardware in TRE 113 by a TRE manufacturer upon TRE 113 manufacturing. For some exemplary embodiments, TRE 113 could omit the use of a primary platform 101, and TRE 113 could process or execute the instructions in a boot update image 106 for updating an initial first boot firmware 106 with an updated first boot firmware 106* using the steps depicted for a primary platform 101 in FIG. 2 below.

In exemplary embodiments, the term "first boot firmware" does not require the processor 109*c* to execute the "first boot firmware" at the very beginning of a boot process for processor 109*c*, and the "first boot firmware" could be loaded by a boot loader and the "first boot firmware" loads the "second boot firmware". In general, the "first boot firmware" both (i) is loaded by processor 109*c* before the "second boot firmware" and (ii) can contain a public key and digital signature algorithm for verifying the subsequent "second boot firmware".

CPU 113*b* can comprise a processor embedded into the TRE 113 and consequently typically with less resources than processing cores 109*c*, such as (i) less cache memory, (ii) operating typically at a slower speed, (iii) fewer internal registers, (iv) lower power consumption due to reduced thermal dissipation for a TRE 113 compared to device 102, etc. CPU 113*b* with interface controller 113*a* can also manage and sequence the flow of data between TRE 113 and the portion of the bus 109*d* extending to TRE 113. CPU 113*b* can also process other functions such as operating a set of cryptographic algorithms 141 recorded in boot firmware 121 or other cryptographic operations within a downloaded and/or operating firmware 106. CPU 113*b* could conduct the processing, computational, and logical steps for TRE 113 and PP 101 as depicted in FIG. 2 and FIG. 3 below, as well as other Figures herein. In exemplary embodiments CPU 113*b* processes instructions or machine executable code for the secondary platform bundle 108 and also the primary platform 101.

The processor 113*b* in TRE 113 can function similar to processor cores 109*c* for SOC 109 as described above. However, processor 113*b* can operate with a form factor, speed, and computational capacity suitable for TRE 113. Processor 113*b* in TRE 113 could be a processor belonging to the exemplary MIPS®, ARM®, or Intel® family of processors, and other possibilities exist as well. Processor 113*b* can include components such as registers, accumulators, and logic elements to add, subtract, multiply, and divide numerical values, and processor 113*b* can be connected to data bus 109*d*. The timing of processor 113*b* and data bus 109*d* can be driven by a clock, which could be either (i) operating internal to TRE 113 and connected to bus 109*d* or (ii) operating external to TRE 113 and input to TRE 113 via bus 109*d*. Processor 113*b* can provide the hardware for TRE 113 to perform calculations for cryptographic algorithms 141 in addition to the general operation of TRE 113 and managing communication between TRE 113 and SOC 109 through electrical connections similar to electrical pads 109*a*. Processor 113*b* could also be connected to internal bus 109*q*. When TRE 113 has received electrical power and loaded boot firmware from EEPROM 113*c*, then TRE 113 using processor 113*b* can operate as a primary platform 101.

EEPROM 113*c* could also comprise a read only memory, where the data in EEPROM 113*c* is written once upon manufacturing of SOC 109. EEPROM 113*c* could also function as a read only memory for TRE 113 similar to ROM 102*c* for device 102 above. In other words, EEPROM 113*c* does not need to be erasable and reprogrammable, although some data in EEPROM 113*c* could be re-written in exemplary embodiments. EEPROM 113*c* could comprise a non-volatile flash memory based on NAND or NOR memory cell technology, and other possibilities exist as well without departing from the scope of the present disclosure. The contents of EEPROM 113*c* will be discussed in additional detail below for this FIG. 1*b*. Although depicted as using EEPROM 113*c*, the data and elements depicted within EEPROM 113*c* in FIG. 1*b* could be alternatively stored in an internal nonvolatile memory (iNVM) 113*s*, where the memory within 113*s* is tagged or set as being "read only" during most of the life of operation of TRE 113. In other words, a physical EEPROM chip or memory cells are not required for some embodiments in order to implement the functionality of EEPROM 113*c* depicted in FIG. 1*b*.

Random access memory 113*e* in TRE 113 can function similar to RAM 102*e* for device 102, with a form factor, speed, and storage capacity suitable for TRE 113. RAM 113*e* can be connected to an internal data bus 109*d* in TRE 113 (where (X) the internal data bus 109*d* in TRE 113 can be separate or distinct from (Y) the internal bus 109*d* outside TRE 113 and in SOC 109). RAM 113*e* and can store data for processor 113*b* in a volatile state, such that data recorded in RAM 113*e* can be essentially flushed or reset when electrical power to SOC 109 and TRE 113 is removed. Random access memory 113*e* can store data such as tables of memory addresses and sectors for memory 109*s* and memory 113*s*, since these tables are ordinarily larger than the registers provided by CPU 113*b*.

For some exemplary preferred embodiments, a TRE 113 could use persistent memory, known as nonvolatile RAM (NVRAM). NVRAM can use transistor gate technology recording binary states within memory cells when electrical power is removed from TRE 113. NVRAM for memory 113*s* in TRE 113 and for PP 101 could use a memory chip supporting the memory technology commercially available in the NVDIMM-P specifications as of 2019 (but not with the DIMM physical form and rather in a specified silicon area for TRE 113 with capabilities for NVRAM technology). In exemplary embodiments, TRE 113 and PP 101 could use persistent memory for memory 113s, and thus obtain the benefits of faster read and write times (with lower power consumption) while also having the benefits of nonvolatile storage, such that firmware 106 could continue to be recorded in memory 113s when power is removed from TRE 113. In exemplary embodiments, the boot update image 106 after the receipt of a message 154 in FIG. 1a can be stored within persistent memory 113s. Firmware 106 could operate within RAM 113e until after firmware 106 sends an "OK" message 157 to configuration server 180.

For some exemplary embodiments, although depicted as separate elements for both (i) processor cores 109c, and RAM 113e, and (ii) CPU 113e and RAM 113e, the two elements (processor and RAM) could comprise the same physical hardware but represent time division or time separation of the physical hardware, similar to how the same physical hardware can host multiple logical processes miming concurrently. In other words, processor cores 109c could switch operations between a "normal" mode functioning as a CPU for device 102 and then a "secure" mode as TRE 113 for device 102. Or, CPU 113b could represent a virtualized process or computer within device 102, where the OS 102h implements virtualization and operates as a host for TRE 113. Switching could take place rapidly enough that processor 109c and TRE CPU 113b would appear to other components (both inside and outside device 102) as separate processors, while there could be a single physical processor inside device 102 such as within SOC 109.

As illustrated in FIG. 1b, TRE 113 and SOC 109 may also contain a random number generator 128. Random number generator 128 can comprise a physical component that generates random or pseudo random numbers for cryptographic operations of TRE 113 and PP 101. A random number generator 128 can also comprise a hardware random number generator. The creation of random numbers with a high degree of entropy is important in the use of steps such authenticating DBCS 108 in a secure session 155a above. Or, random numbers from random number generator 128 could be used with the creation of nonce values or challenge values for use with digital signatures.

EEPROM 113c in TRE 113 can include a PP certificate 120, PP boot firmware 121, CU boot configuration 123, certificate authority public key 133, certificate authority public key parameters 111a, a primary platform private key 115a, and a symmetric key 127. PP private key 115a and symmetric key 127 can be recorded in a protected memory 125 in nonvolatile memory 113s, similar such that (i) only TRE 113 can read PP private key 115a using instructions in PP boot firmware 121 and (ii) PP private key 115a may not be read by device 102 or transferred out of TRE 113 in exemplary embodiments. In exemplary embodiments, PP boot firmware 121 or firmware 106 can omit instructions that would allow PP private key 115a to be transferred to electrical pads 109a.

Note that PP private key 115a could be used for digital signature operations by TRE 113 and primary platform 101, and key 115a can be different than a primary platform private key used for downloading firmware 106 from IDS 103. By recording the keys in EEPROM 113c during manufacturing, the values can be fixed and TRE 113 can be reasonably assured about the security and integrity of these keys during operation.

Data can be written to EEPROM 113c by a TRE configuration unit during manufacturing of TRE 113. The data in EEPROM 113c for TRE 113 can be written into EEPROM 113c in TRE 113 and SOC 109 before SOC 109 is distributed to a manufacturer of device 102. PP certificate 120 can be written to EEPROM 113c by a TRE configuration unit (i) after the generation of PP private key 115a, and (ii) after the signature of the corresponding PP public key 115b by a certificate authority.

PP certificate 120 can include the PP identity PP-ID 109i, PP public key 115b (corresponding to PP private key 115a), certificate parameters 111a, and a certificate authority digital signature 116. PP certificate 120 can be formatted according to the X.509 v3 specifications, among other possible formats, and stored as a plain text file, *.pem file, or *.crt file or similar file formats. PP certificate 120 can be used by TRE 113 and SOC 109 in order to verify identity of TRE 113 to device 102 or a server such as server 103 (including verifying identity of TRE 113 to a network). In exemplary embodiments, parameters 111a in CU certificate 120 can include an expiration time of PP certificate 120 longer than the expected operational lifetime of TRE 113, and in this manner PP certificate 120 can remain valid whenever SOC 109 is utilized. An exemplary expiration time of PP certificate 120 could be 25 years, although other possibilities exist as well.

PP boot firmware 121 in EEPROM 113c can provide machine executable code for processor 113b to initiate operations when electrical power is provided to TRE 113 and SOC 109 via the electrical pads 109a. Although not illustrated in FIG. 1b, processor 113b may also include a ROM memory with CPU 113b instructions for CPU 113b to fetch PP boot firmware 121 upon startup when power is provided to CPU 113b. In exemplary embodiments, PP boot firmware 121 could comprise a "Primary Boot Loader" for processor 113b. PP boot firmware 121 can include a set of cryptographic algorithms 141, described in the paragraph below, and memory control libraries 122. PP boot firmware 121 in EEPROM 113c could also include instructions for TRE 113 receive, authenticate, and decrypt the encrypted firmware image 106* from a message 154 in FIG. 1a. In other words, PP boot firmware 121 can launch an operating system for PP 101, where the OS for PP 101 could operate as a host for the boot update firmware 106. Although TRE 113 with PP 101 depicts firmware 106 as loaded and operating within a RAM memory 113e, for some embodiments the firmware 106 could be loaded into nonvolatile memory 113s.

Cryptographic algorithms 141 in memory 113c can comprise digital signature algorithms such as ECDSA or DSA, symmetric ciphering algorithms such as AES and TripleDES, key exchange algorithms, key pair generation algorithms, random number generators, secure hash algorithms such as SHA-2 or SHA-3, and asymmetric ciphering algorithms such as El gamal or RSA. Libraries in cryptographic algorithms 109q could be from standard open source libraries such as OpenSSL, crypto++, Bouncy Castle, or Mozilla libraries from Network Security Services, and other possibilities exist as well. Cryptographic algorithms with parameters 111a could be used to support a digital signature from DBCS 180 of signature 208a in FIG. 2 below, such that PP 101 can only allow access for firmware 106 to write the updated first boot firmware 160* to memory 109f after the verification of a digital signature 208a.

Memory control libraries 122 could include software or firmware to manage and schedule the operation of TRE 113, such as machine code for (i) instructing processor 113b to write data to bus 109q for memory controller 113k when data is recorded in memory 109f, (ii) read data from bus 109d when data from SOC 109 is passed to TRE 113, (iii) reading PP private key from protected memory 125 or protected memory 113i when cryptographic algorithms 141 for TRE 113 need the private keys for cryptographic operations such as a key exchange or digital signatures. Memory control libraries 122 can include the software libraries and firmware for processor 113b to manage all input and output of TRE 113, including embodiments where TRE operates as a separate component connected to bus 102d and separate from SOC 109. Other possibilities exist as well for memory control libraries 122 to support the operation of TRE 113 and SOC 109 via program instructions provided to processor 113b without departing from the scope of the present disclosure. Note that memory control libraries 122 could also allow PP 101 to operate multiple different firmware 106 or secondary platform bundles concurrently, such as for encapsulating and isolating data for each firmware 106, such that different firmware 106 could not read or write to data within TRE 113 that does not belong to the firmware 106.

Memory control libraries 122 can also include PP read instructions 163 and PP write instructions 164. PP read instructions 163 can provide machine executable code for processor 113b to read data from device 102 and/or SOC 109 using a data bus 109d or bus 109q. PP read instructions 163 can provide the read libraries for firmware 106 to call in order for firmware 106 (or firmware 116) to read data from physical memory within TRE 113. The data read from physical memory by PP read instruction 163 for a firmware 106 or SPB 108' could be used with cryptographic algorithms 141 by TRE 113. In this manner, PP read instructions 163 could provide both (i) the logical software or firmware interface for TRE 113 to receive data from device 102 and (ii) isolate data for different firmware 106 or SPB operating in PP 101.

PP read instructions 163 could specify memory addresses or file locations in a file system for non-volatile memory 109s or memory 113s or memory 113e. For example, PP read instructions 163 could be used by PP 101 for data in memory 109s where device 102 can write data in order to be read by TRE 113. In an exemplary embodiment, (i) device 102 could write a file with an exemplary name "firmware_update_version_1.5" (which could comprise ciphertext firmware 106*) to a specified location in device memory 102s or 109s. Then, after commands from agent 102x, (ii) PP read instructions 164 could instruct processor 113b to read the image 106* data and subsequently process the image 106* data with firmware decryption.

EEPROM 113c in TRE 113 for SOC 109 can also include a PP boot configuration 123, a certificate authority public key 133, certificate authority public key parameters 111a, a PP private key 115a and a symmetric key 127. PP boot configuration 123 can provide values for the configuration or operation of TRE 113 when operating with the PP boot firmware 121, such as specifying (i) the frequency to operate a bus 109d for data input SOC 109 or device 102, (ii) the frequency to operate a processor 113b as well as processor configuration settings, (iii) a boot firmware version number, (iv) the memory capacity of memory 109f or 113e for TRE 113 or iNVM 113i, and (v) parameters specifying values for hardware within TRE 113.

Certificate authority (CA) public key 133 can be utilized by TRE 113 to verify digital signatures received where the digital signature was generated and signed with a CA private key, such as a certificate for a server. CA public key parameters 111a can specify the parameters for using the CA public key 133, where parameters 111a can be a subset of the parameters supported by cryptographic algorithms 141. Exemplary parameters 111a are depicted and described in connection with FIG. 1c below, such as specifying a key length, digital signature algorithm 111d and secure hash algorithm 111e to utilize, etc. Note that (i) parameters 111a for CA public key 133 and (ii) parameters 111a for a PP static public key of PK.PP 115b and/or PP private key 115a can be different.

Although a single CA public key 133, PP private key 115a, symmetric key 127, and PP certificate 120 is depicted in FIG. 1b, an EEPROM 113c or SOC 109 could record a plurality of each of these and associated elements. For example TRE 113 could record two different private keys 115a in EEPROM 113c, where a first private key 115a is used with asymmetric ciphering algorithms (such as El Gamal based encryption) and a second private key 115b is used with digital signature algorithms. Each of the first and second private keys could have a corresponding public key 115b, and consequently two different PP certificates 120 (each with a different public key 115b) could be recorded in an EEPROM 113c. CA public key 133 could also be used with asymmetric ciphering algorithms in 141, such that TRE 113 could encrypt data using the CA public key 133 and the certificate authority could subsequently decrypt the encrypted data using the CA private key corresponding to the CA public key 133.

In exemplary embodiments, initial PKI keys for SOC 109 may be recorded in EEPROM for TRE 113 as shown in FIG. 1b, and subsequent or updated versions of the keys can be recorded in memory 109s or memory 113s. Certificate Authority (CA) Public Keys 133 can also record a set of root certificates for TRE 113 and SOC 109 to use with verification of certificate authority digital signatures for certificates. Root certificates recorded in CA public keys 133 can comprise the list or a subset of the list of included root certificates from the Mozilla Foundation with Mozilla projects, where the aggregate list of community approved root certificates and associated parameters is in the widely distributed file certdata.txt from the Mozilla web site.

FIG. 1c

FIG. 1c is an illustration of an exemplary set of cryptographic parameters for an initial first boot firmware and an updated first boot firmware, in accordance with exemplary embodiments. Cryptographic parameters 111 can specify sets of cryptographic parameters for cryptographic algorithms that are supported by primary platform 101, a firmware 106, and a device boot configuration server 180, and device boot firmware 160 and 160*, in order to support the systems and methods herein. Cryptographic parameters 111 or subsets thereof can be recorded in nonvolatile memory in each of PP 101, firmware 106, and configuration server 180. An initial first boot firmware 160 could include a first set of cryptographic parameters 111a' and an updated first boot firmware 160* could include a second set of cryptographic parameters 111a".

Cryptographic parameters 111 can include values for an identification of set identifier 111a, a key length 111b, a type or name 111c, a signature algorithm 111d, a secure hash algorithm 111e, a key exchange mechanism 111f, and a public key or certificate for boot firmware of cert.BF 160c for each of the different the parameters 111a. Although not depicted for cryptographic parameters 111 in FIG. 1c, the cryptographic parameters 111 could also specify values or settings for a symmetric ciphering algorithm such as a symmetric ciphering key length, settings for a symmetric ciphering algorithm, and a random number length used to create random numbers, padding schemes, encoding rules such as DER, BER, etc.

As contemplated herein, when a selected set of cryptographic parameters such as using the words or description "parameters 111a" or "cryptographic parameters 111a" can specify a row of parameters or values in a set of cryptographic parameters 111, such that the collection of values in the row can be used with a digital signature algorithm for both generating digital signatures with a private key and verifying digital signatures with a public key. Set identifier 111a can be an identity for a row or set of values for cryptographic parameters 111. Set identifier or group or subset 111a' could represent a first set of cryptographic parameters supported by initial first boot firmware 160 and second boot firmware 161 (which is also depicted and described for processor 109c in FIG. 1b). Set identifier or group or subset 111a" could represent a second set of cryptographic parameters supported by an updated first boot firmware 160* and an updated second boot firmware 161*. PK key length 111b could represent the length of a public key in bits or bytes. Parameters 111 could include the length of a private key in bits or bytes as well.

The type or name 111c for a set of cryptographic parameters 111 can specify the cryptographic algorithms to use with PKI keys, such as the exemplary names for ECC curves and also post-quantum cryptography cryptographic algorithms. The field of post-quantum cryptography continues to develop with proposed algorithms currently undergoing revisions for standardization as of October 2019. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Feb. 22, 2019, which is hereby incorporated by reference. The type 111c for cryptographic parameters 111 can specify an ECC named curve, a post-quantum cryptography cryptographic algorithm, or RSA based algorithms for PKI keys used with the type 111c for PKI keys using or associated with the type.

For use of ECC algorithms within a type 111c, parameters 111 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters 111 can specify domain parameters for elements in system 100 to calculate values or numbers in a compatible manner, such as (i) a common base point G for use with ECC PKI key pairs and (ii) a defining equation for an elliptic curve. Parameters 111a can also specify settings to use with (i) a set of cryptographic algorithms 141 as depicted and described in connection with FIG. 1b above or (ii) the set of cryptographic algorithms for SPB OS 108h.

Signature algorithm 111d for a set of cryptographic parameters 111 can specify the digital signature algorithm used with the PKI keys for a selected subset of cryptographic parameters 111a. Exemplary signature algorithms include ECDSA, GeMSS, qTesla, DSA, and other possibilities exist as well. For example, the signature algorithm 111d in a selected set of cryptographic parameters 111a"-x can be used by an updated second boot firmware 161* for a digital signature to be verified by an updated first boot firmware 160* with public key in cert.BF 160c. The use of a selected set of cryptographic parameters 111a"-x for digital signature generation and verification is also depicted and described in connection with FIG. 3 below. Other possibilities for signature algorithms 111d and types 111c, as well as key lengths 111b are possible as well without departing from the scope of the present disclosure.

Hash algorithm 111e in cryptographic parameters 111e can be the name of a secure hash algorithm, such as the exemplary SHA-256 algorithm depicted, which may also be referred to as "SHA-2". Although not depicted in FIG. 1c, settings for a symmetric ciphering algorithm in cryptographic parameters 111 can specify (i) the identity or name of a symmetric ciphering algorithm such as "AES", "AES-SIV", 3DES, Blowfish, etc, and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc.

Key exchange 111f can specify a key exchange algorithm used with the PKI keys for a set of cryptographic parameters 111a. Exemplary exchange algorithms can include an ECDH key exchange using the type 111c. Key exchange 111f could also support other key exchange mechanisms (KEM) such as those for post-quantum cryptographic algorithms depicted as "KEM". The specific steps for a key exchange can be specified according to the type 111c. In general a key exchange mechanism or key exchange 111f can comprise using a public key from a remote entity and a local private key in order to derive a shared secret. The key exchange mechanism could also comprise encrypting a symmetric ciphering key with a public key and decrypting the symmetric ciphering key with a private key. Other possibilities exist as well for a key exchange 111f in parameters 111 in order to select or specify the use of cryptographic algorithms without departing from the scope of the present disclosure.

Cryptographic parameters 111 can also be associated with the use of public keys and certificates by both a primary platform 101 and firmware 106. Thus, the parameters 111 specified above can identify or be associated with cryptographic algorithms to use, such as (i) a first set of cryptographic algorithms 141 within a primary platform 101 and (ii) a second set of cryptographic algorithms 141 used by firmware 106 in OS 106h. An operating system 108h or Secure Session Library (PQC) 106s within a firmware 106 could record cryptographic algorithms 141 that could implement the parameters 111a. As depicted in FIG. 1c, parameters 111 as contemplated herein may also identify or be associated with public keys and certificates. Note that the public keys and certificates for a set of cryptographic parameters 111a could use the values for the cryptographic parameters 111a, such as a public key having a length of 111b and type of 111c and a certificate could use a signature algorithm 111d with a hash algorithm 111e.

Each set of cryptographic parameters 111a for a primary platform 101 can include a primary platform public key PK.PP 115b, a primary platform certificate Cert.PP 120, a certificate chain for the primary platform, and a certificate authority root certificate Cert-root.CA 133. The primary platform public key PK.PP 115b and the primary platform certificate Cert.PP 120 were also depicted and described in connection with FIG. 1b above. The certificate chain for the primary platform of can comprise a chain of certificates from the primary platform certificate Cert.PP 120 through a certificate issuer root certificate Cert-root.CA 133. In exemplary embodiments, the certificate chain of primary platform 101 can include multiple intermediate certificates between Cert.PP 120 and root certificate Cert-root.CA 133.

FIG. 2

FIG. 2 is a simplified message flow diagram illustrating an exemplary system with exemplary data sent and received by (i) a device with a primary platform operating a boot update image, (ii) a device boot configuration server, and (iii) a second boot firmware server, in accordance with exemplary embodiments. System 200 can include a device 102 and a device boot configuration server (DBCS) 180 and a second boot firmware server 201 communicating through an IP network 105. As contemplated herein, the device boot configuration server (DBCS) 180 can also be referred to as configuration server 180. Device 102 and components in device 102 were depicted and described in connection with FIG. 1*a* and FIG. 1*b* above. The a second boot firmware server 201 can be the source of an updated second boot firmware 161*, which is also depicted and described in connection with FIG. 1*b* above. Although a single device 102, server 180, and server 201 are depicted in FIG. 2, a system 200 could include a plurality of each of the devices and servers shown.

In exemplary embodiments, a Secondary Platform Bundle Manager (SPBM) as described in the SSP Requirements document could operate a configuration server 180 and server 201. System 200 supports a need in the art for a configuration server 180 and server 201 to securely update boot firmware for a device 102. Although the download of firmware 106 in a system 100 can support mutual authentication of the PP 101 and an image delivery server 103, a second, different entity could operate the configuration server 180 after the download of firmware 106, and the configuration server 180 can preferably support transfer of first boot firmware 160* in a manner where PP 101 operating firmware 106 and the configuration server 180 can be mutually authenticated, in order to address the needs in the art as described above. In addition, a third, different entity could operate the second boot firmware server 201 depicted in FIG. 2.

Device 102 can include a primary platform 101 as depicted in FIG. 2, along with the other components for a device 102 depicted in FIG. 1*a* and a primary platform 101 within a TRE 113 depicted and described in connection with FIG. 1*b*. The primary platform 101 could decrypt encrypted firmware 106* from IDS 103 and load the firmware 106 into memory of TRE 113. The loaded firmware could comprise the boot update firmware 106. In exemplary embodiments as depicted in FIG. 2, the boot update firmware 106 can communicate with a host primary platform 101 and SOC 109. For example, PP 101 could support a logical interface allowing firmware 106 to query SOC 109 for a processor configuration 109*cc*. PP 101 could also support a logical interface for firmware 106 to establish a secure session 155*a* with DBCS 108 and read the processor configuration 109*cc* in a message 205. For some embodiments, TRE 113 with processor 113*b* could operate the boot update image 106 without requiring a primary platform. The boot update image 106 could be a software or firmware package for a boot loader updater and the boot update image could be securely stored in memory 113*s*.

At step 202*a*, configuration server 180 could record values or settings for (i) the secure communication with PP 101 through device 102 and (ii) a program equivalent to device program 102*i* in order for configuration server 180 to select and transfer an updated first boot firmware 160* to device 102 operating firmware 106 in PP 101. The data could include an identity for configuration server 180 to use of ID.DBCS 180*i* such as a domain name, a web server such as Apache or IIS that support secure sessions such as TLS, a certificate of DBCS 180 of Cert.DBCS 180*c* along with the corresponding private key 180*p* as well as a preferred list of parameters 111*a* available for the establishment of secure session 155*a*. CS 180 could also record at least one certificate authority root certificate 133. Additional data could be recorded by a CS 180 in a step 202*a* without departing from the scope of the present disclosure. CS 180 could also record a plurality of each of the values for 180*c*, 180*p*, and 133 for different sets of cryptographic parameters 111*a* supported by CS 180.

At step 202*c*, the second boot firmware server 201 could record values or settings for (i) the secure communication with device 102 and (ii) a program equivalent to device program 102*i* in order for server 201 to select and transfer an updated second boot firmware 161* to device 102. The data could include an identity for server 201 to use such as a domain name, a web server such as Apache or IIS that support secure sessions such as TLS, a certificate for server 201 along with the corresponding private key as well as a preferred list of parameters available for the establishment of a secure session with device 102 in order to transfer updated second boot firmware 161* to device 102. Additional data could be recorded by a CS 180 in a step 202*c* without departing from the scope of the present disclosure.

Device 102 could conduct a step 110 in order to securely download the firmware 106 from an image delivery server 103, where the step 110 was depicted and described in connection with FIG. 1*a* above. Device 102 using PP 101 could conduct a step 202*b* in order to decrypt firmware 106 and verify a digital signature for firmware 106 from image maker 190 or IDS 103 that firmware 106 is authorized and authenticated for PP 101. Step 202*b* can include PP 101 loading and launching the firmware 106. In exemplary embodiments, the firmware 106 in a step 202*b* could be loaded from NVM 113*s* into RAM 113*e* within TRE 113 as depicted and described in connection with FIG. 1*b* above. As depicted in FIG. 2, the PP 101 can include and operate the firmware 106, and thus steps performed and messages sent/received in FIG. 2 could also be conducted by the PP 101 (where the PP 101 could use the firmware 106 in order to perform some steps and send/receive some messages as depicted in FIG. 2). The operation of a PP 101 with firmware 106 with hardware components is also depicted and described in connection with FIG. 1*b* above.

Firmware 106 could establish a secure session 155*a* with configuration server 180, including using (i) the identity ID.DBCS 180*i* to locate CS 180 on the IP network 105, (ii) the certificate Cert.DBCS 180*c* to authenticate CS 180 in the secure session 155*a*, and (iii) a set of cryptographic parameters 111*a*. The firmware 106 and CS 180 could establish the authenticated and encrypted secure session 155*a* using the certificate Cert.DBCS 180*c*. In some exemplary embodiments, the secure session 155*a* could comprise a TLS v1.3 session such as that specified in IETF RFC 8446, and other possibilities exist as well for the format and data used to establish the secure session 155*a* without departing from the scope of the present disclosure. Note that firmware 106 could include a secure session library 106*s* for establishing a secure session with parameters 111*a* that support standardized post-quantum cryptographic (PQC) algorithms, and thus the secure session 155*a* could support future versions of a TLS that implement support for PQC algorithms (and in this case not TLS v 1.3, since that version depends on ECC algorithms). For some exemplary embodiments, firmware 106 downloaded in a step 110 can include the updated first boot firmware 160*, where server 103 could select the updated first boot firmware 160* based on TRE credentials 151. For these embodiments, then messages 155 and 156 in a system 200 could be omitted.

After the setup of secure session 155*a*, the firmware 106 can conduct a step 106*b'* to operate the processor ID utility 106*b*, which is also described above in FIG. 1*a*. The utility 106*b* could support a variety of processors 109*c* and query the processor 109*c* in a message 204 for the processor configuration 109*cc*. SOC 109 could respond to the query in message 204 with a response message 205. The response message 205 from SOC to the firmware 106 could include the supported processor configuration 109*cc* for a processor 109*c* in SOC 109. Configuration data 109*cc* can include a processor identity such as CPUID, an operating microcode version, datapaths such as 32 bit or 64 bit, supported instruction sets such as SSE versions, no execute bits, a memory start address for processor read only memory 109*f* for the location of first boot firmware 160, etc. In general, the configuration data 109*cc* can be sufficiently detailed for a server such as DBCS 180 to determine an updated first boot loader firmware 160* that would operate on SOC 109 with processing cores 109*c* Firmware 106 can then establish secure session 155*a* by sending a first message 155. The parameters, keys, and values used by firmware 106 and CS 180 were also described for a secure session 155*a* in FIG. 1*a*. The message 155 with secure session 155*a* can include the processor configuration 109*cc* received by firmware 106 in a message 205. Note that secure session 155*a* can use all of ID.DBCS180*i*, certificate for DBCS of cert.DBCS180*c*, the secure session library 106*s*, a set of cryptographic parameters 111*a* for the library 106*s*, and cert DBCS 180*c*. For secure sessions 155*a* that support mutual authentication, secure session 155*a* can also use primary platform certificate cert.PP 120, a certificate chain for the cert.PP 120, as well as a certificate authority root certificate 133. The first message 155 can include the processor configuration 109*cc* received by PP 101 in a message 205.

Configuration server 180 can then conduct the series of steps to process the received processor configuration 109*cc* and select or generate an updated first boot firmware 160* for processor 109*c* in device 102. The series of steps can comprise or support a step 181 for CS 180, which is also depicted and described in connection with FIG. 1*a* above. At a step 206, CS 180 can read the processor configuration 109*cc* to determine the capabilities of processor 109*c*. In some exemplary embodiments, the processor configuration 109*cc* can include a copy of the initial first boot firmware 160 and a step 206 can include CS 180 reading the initial first boot firmware 160 in order to determine the first set of cryptographic parameters 111*a'* and public key cert.BF 160*c* within initial first boot firmware 160.

In some exemplary embodiments, a processor configuration 109*cc* as transmitted by firmware 106 could include the first set of cryptographic parameters 111*a'* and public key cert.BF 160*c*. In another exemplary embodiment, the processor ID utility 106*b* can also include steps to determine or read the first set of cryptographic parameters 111*a'* and public keys cert.BF 160*c* from the initial first boot firmware 106, and the values of the first set of cryptographic parameters 111*a'* and public key cert.BF 160*c* could be included within the message 155. In another embodiment, in a step 206 CS 180 could use an identity from message 155 such as (i) a PP-ID 101*i* in a cert.PP 120 or (ii) a CPUID in processor configuration 109*cc* in order to query another server to obtain the first set of cryptographic parameters 111*a'* and public keys cert.BF 160*c* used in a initial first boot firmware 160.

At a step 207, CS 180 can use the data from a step 206, such as processor configuration 109*cc*, first set of cryptographic parameters 111*a'* and public keys cert.BF 160*c* in order to select a preferred second set of cryptographic parameters 111*a"* with associated public keys cert.BF 160*c"* for an updated first boot firmware 160*. A step 207 could also include CS 180 using an identity from message 155 such as (i) a PP-ID 101*i* in a cert.PP 120 or (ii) a CPUID in processor configuration 109*cc* in order to query another server to obtain the preferred second set of cryptographic parameters 111*a"* with associated public keys cert.BF 160*c"* for an updated first boot firmware 160*.

For example, the PP-ID 101*i* or CPUID could be used to query a device owner or service provider or a server 201 for a preferred level of security or preferred cryptographic parameters 111*a"* and associated public keys cert.BF 160*c"* for the updated first boot firmware 160*. In exemplary embodiments, a preferred level of security and expected operating lifetime of device 102 could be used to select the preferred cryptographic parameters 111*a"* in a step 207. For devices that are expected to operate for a decade or longer, then the use of PQC algorithms in parameters 111*a"* for an updated first boot firmware 160* could be preferred. As one example of CS 180 querying another server in a step 207, CS 180 could query server 201 for the parameters 111*a"* used with a second boot firmware 161*, and consequently CS 180 could select the parameters 111*a"* in a step 207 using data from server 201. Consequently CS 180 could select at least the specified cryptographic parameters 111*a"* and associated public keys cert.BF 160*c"* for use with the second boot firmware 161* to be supported by an updated first boot firmware 160* in a step 207.

At a step 208, CS 180 can select or process an updated first boot firmware 160* or boot loader for device 102 and processor 109*c* using the data from a step 207. CS 180 could record a plurality of updated first boot firmware 160* to support different processors 109*c* and configurations 109*cc* along with different cryptographic parameters 111*a"* with associated public keys cert.BF 160*c"*, and select from the plurality of stored updated first boot firmware 160* using the data from step 207 (e.g. preferred parameters or public keys or processor type in configuration 109*cc*, etc.). In some exemplary embodiments, CS 180 could compile or build the machine executable code for processor 109*c* with configuration 109*cc* in a step 208 (e.g. using build tools such as gnu gcc), where the output of the compilation in a step 208 includes the updated first boot firmware 160* for processor 109*c* in device 102. A compilation step 208 could also include building the updated first boot firmware 160* with the cryptographic algorithms supporting the selected set of cryptographic parameters 111*a"* and public keys cert.BF 160*c"*. Note that the updated first boot firmware 160* could also be built in a step 208 before download of firmware 106 by device 102 (for a plurality of different combinations of processors 109*c* and parameters 111*a"* and public keys cert.BF 160*c*) during a step 202*a* above. The "pre-built" firmware 160* could be selected in step 208.

Configuration server 180 in a step 208 could also request for a digital signature 208*a* for the updated first boot firmware 160*, where the digital signature 208*a* could be verified by PP 101 using the certificate authority root certificate 133. Digital signature 208*a* could include a certificate chain of parent or intermediate certificates for verification of digital signature 208*a* up through the root certificate 133. Note that PP 101 includes the compatible root certificate 133 (depicted as "CA public key 133" in FIG. 1*b*), and the compatible root certificate could also be used to establish secure session 155*a*. The parameters for the digital signature 208*a* could comprise a set of parameters 111*a* used by the certificate authority root certificate 133. Configuration server 180 could query another server, such as a server operated by the certificate authority associate with root certificate 133 to generate digital signature 208*a* and provide a certificate 208*b* for the digital signature 208*a*, where the certificate 208*b* for the digital signature 208*a* can be verified with a chain of parent or intermediate certificates that is verified by the root certificate 133 (or another certificate securely stored within PP 101).

Configuration server 180 can then send the message 156 in the secure session 155*a*, where the message 156 can include the updated first boot firmware 160*. A message 156 in secure session 155*a* was also depicted and described in connection with FIG. 1*a* above. A message 156 can include the updated first boot firmware 160* from the step 181, where the updated first boot firmware 160* can be for processor 109*c* using a processor configuration 109*cc*. Message 156 can also include the second set of cryptographic parameters 111*a*", where the second set of cryptographic parameters 111*a*" were used by the updated first boot firmware 160* and selected in a step 207 above. In exemplary embodiments, the second set of cryptographic parameters 111*a*" can be included within the machine executable code of the updated first boot firmware 160* and then also as text or encoded text within message 156.

Message 156 can include a set of selected public keys such as cert.BF 160*c*" which could be selected in a step 207 and be associated with cryptographic parameters 111*a*" (e.g. at least one public key 160*c* for each parameters 111*a*"), such that the updated first boot firmware 160* could use the public key and parameters in order to verify a digital signature within an updated second boot firmware 161*. Message 156 can also include the digital signature 208*a* for the updated first boot firmware 160* processed in a step 208 as well as the certificate 208*b* for verifying the digital signature 208*a*.

Boot update firmware 106 operating within PP 101 and device 102 could receive the data within message 156, where device 102 uses agent 102*x* to write the data from message 156 to TRE 113. In general and as contemplated herein, when firmware 106 or a primary platform 101 is described as receiving data, the step can comprise device 102 receiving the data and then using an agent 102*x* in order to write the data to PP 101 and TRE 113. In other words, firmware 106 could receive the data from PP 101, which could receive the data from agent 102*x*, which could receive the data from network interface 102*a*. Other possibilities exist as well for the steps of a firmware 106 and PP 101 to receive data without departing from the scope of the present invention.

Boot update firmware 106 could in a step 209 verify digital signature 208*a* with certificate 208*b* in a step 209, for embodiments where the firmware 106 OS 106*h* supports the cryptographic parameters for certificate 208*b*. In other words, in exemplary embodiments boot update firmware 106 can verify digital signature 208*a* over at least the updated boot firmware 160* in a step 209 using the public key in the certificate 208*b*. In a step 171*a*, boot update firmware 106 could generate a request 171*b* for PP 101 to copy or backup the initial boot firmware image 160 from memory 109*f* to the backup location memory 171 as depicted and described in connection with FIG. 1*b*.

Boot update firmware 106 operating within PP 101 and device 102 could send a message 210 to PP 101. Message 210 could include (i) a request 171*b* to backup the initial first boot firmware image 160 to backup boot memory location 171 in memory 109*f*, (ii) a request to replace the initial first boot firmware image 160 with the updated first boot firmware 160*, and (iii) the values for selected cryptographic parameters 111*a*" supported by the updated first boot firmware 160*, the public keys used or supported by the updated first boot firmware 160* of cert.BF 160*c*, and digital signature 208*a* along with the certificate 208*b* to verify digital signature 208*a*.

PP 101, such as operating with PP boot firmware 121 could receive the message 210 and conduct a step 210*a* in order to process the data. The first step within a step 210*a* can comprise PP 101 verifying digital certificate 208*b* through a certificate chain up to a securely stored certificate authority certificate. The securely stored certificate authority certificate could comprise the certificate 133, although a different certificate stored within PP 101 could be used as well. After verifying digital certificate 208*b*, in a step 210*b* PP 101 could accept and conduct the request 171*b* to backup the initial first boot firmware 160 to the backup boot memory location 171. Note that PP 101 using memory interface 113*k* can have write access to the memory 109*f* which can be read only for processor 109*c*. Conducting the request 171*b* by PP 101 in a step 210*b* to backup can be important to ensure that device 102 can operate properly, in case there is an issue with the writing of the updated first boot firmware 160* to memory 109*f* for processor 109*c* to load upon boot.

After PP 101 receives firmware 106 in a step 110, device 102 with SOC 109 can conduct a step 211 to request an updated second boot firmware 161* that can support an updated first boot firmware 160*. As depicted in FIG. 2, the step 211 and subsequent messages between device 102 and a second boot firmware server 201 can be conducted independently from the messages between the PP 101 and the DBCS 180. Thus a step 211 through 216 could begin before or after steps 210*a* and 210*b*. But, a step 211 through 216 could complete before the step 217 to replace the initial first boot firmware 160 with the updated first boot firmware 160* by PP 101 and firmware 106. The data for device 102 using a device program 102*i* and SOC 109 to conduct step 211 and related messages could be stored with the initial second boot firmware 161, or other software or firmware loaded by the initial second boot firmware 161. Or, for embodiments, the updated first boot firmware 160* with public key cert.BF 160*c* received in a message 156 could specify the identity of server 201 (e.g. cert.BF 160*c* could include an identity for server 201 since server 201 could generate a digital signature 214*s* below using the private key corresponding to the public key in cert.BF 160*c*). A step 211 can include device 102 selecting server 201 as the source for an updated second boot firmware 161*

After a step 211, device 102 using SOC 109 could then send server 201 a message 212, where the message 212 can include a query for updated second boot firmware 161*. The message 212 with the query for updated second boot firmware 161* can also include data for the second set of cryptographic parameters 111*a*", supported public keys 160*c*", and a processor configuration 109*cc*. The parameters 111*a*" and keys 160*c*" for a message 212 could be received by device 102 from CS 180 in a message 156, as depicted in FIG. 2. Note that device 102 and server 201 could establish a secure session equivalent to secure session 155*a* between PP 101 and DBCS 180. In this manner, the message flows 212 and 215 can be both mutually authenticated and encrypted. For some exemplary embodiments, a message 212 could also include a copy of the initial second boot firmware 161, such that server 201 could process the initial second boot firmware 161 in order to confirm the firmware values and settings required in order to subsequently select or generate an updated second booth firmware 161*.

At step 213, the second boot firmware (SBF) server 201 can use the information and data from a message 212 to select or generate an updated second boot firmware 161\*. At a step 213, SBF server 201 can use the data from a message 212, such as processor configuration 109cc, second set of cryptographic parameters 111a" supported by the updated first boot firmware 160\* and public keys cert.BF 160c" supported by the updated first boot firmware 160\* in order to select at least one operating second set of cryptographic parameters 111a"-x and an associated public key cert.BF 160c"-x for an updated first boot firmware 160\*. An operating second set of cryptographic parameters 111a"-x and an associated public key cert.BF 160c"-x can comprise a subset of parameters 111a" and public keys cert/BF 160c" as depicted and described in connection with FIG. 1c above. A step 213 could also include SBF server 201 using an identity from message 212 such as (i) a device identity for device 102 such as ID.Device 102k or (ii) a CPUID in processor configuration 109cc in order to query another server to obtain the preferred operating second set of cryptographic parameters 111a"-x with associated public key cert.BF 160c"-x for an updated second boot firmware 161\*.

For example, an identity for device 102 of ID.Device 102k or CPUID could be used to query a device owner or service provider of device 102 for a preferred level of security or preferred operating cryptographic parameters 111a"-x and associated public key cert.BF 160c"-x for the updated second boot firmware 161\*. In exemplary embodiments, a preferred level of security and expected operating lifetime of device 102 could be used to select the preferred operating cryptographic parameters 111a"-x in a step 213. For devices that are expected to operate for a decade or longer, then the use of PQC algorithms in parameters 111a"-x for an updated second boot firmware 161\* could be preferred. Consequently server 201 could select at least the specified operating cryptographic parameters 111a"-x and associated public key cert.BF 160c"-x for use with the updated second boot firmware 161\* to be supported by an updated first boot firmware 160\* in a step 213.

Note that in some exemplary embodiments the set of operating parameters 111a"-x and the second set of parameters 111a" can be the same (e.g. the set of parameters 111a" only has one row for a table depicted in FIG. 1c). Or, the set of operating parameters 111a"-x could comprise more than one row, such as supporting different parameters. In preferred exemplary embodiments, a step 214 by a SBF server 201 selects at least two different sets of operating parameters 111a"-x, where (ii) a first member of operating parameters 111a"-x (e.g. a row in FIG. 1c) supports a first PQC algorithm, and (ii) a second member of operating parameters 111a"-x supports a second and different PQC algorithm. In this manner, a system 200 can remain more secure, such that the updated second boot firmware 161\* can be verified with two separate public keys cert.BF 160c"-x. If a proposed PQC algorithm is later found to be insecure, then one of the two sets of operating parameters 111a"-x could be deprecated by a updated first boot firmware 160\* (e.g. a second update of updated first boot firmware 160\* could remove support for the deprecated parameters 111a"-x, but the updated second boot firmware 161\* would not need to be updated again since it contains two different and valid digital signatures where only one of the two are deprecated).

At a step 214, SBF server 201 can select or process an updated second boot firmware 161\* for device 102 and processor 109c using the data from a step 213 and message 212. Server 201 could record a plurality of updated second boot firmware 161\* to support different processors 109c and configurations 109cc along with different operating cryptographic parameters 111a"-x with associated public keys cert.BF 160c"-x. Server 201 could select from the plurality of stored updated second boot firmware 161\* using the data from step 213 (e.g. preferred operating parameters 111a"-x or public keys or processor type in configuration 109cc, etc.).

In some exemplary embodiments, SBF server 201 could compile or build the machine executable code for processor 109c with configuration 109cc in a step 214 (e.g. using build tools such as GNU gcc), where the output of the compilation in a step 214 includes the updated second boot firmware 161\* for processor 109c in device 102. A compilation step 214 could also include building the updated second boot firmware 161\* with the cryptographic algorithms supporting the selected operating set of cryptographic parameters 111a"-x and public keys cert.BF 160c"-x. Note that the updated second boot firmware 161\* could also be built in a step 214 before receipt of a message 212 from device 102. The use of previously building second boot firmware 161\* before a message 212 could be conducted for a plurality of different combinations of processors 109c and operating parameters 111a"-x and public keys cert.BF 160c"-x) such as during a step 202c above. The "pre-built" firmware 161\* could be selected in step 214.

The second boot firmware server 201 in a step 214 could also request for a digital signature 214s for the updated second boot firmware 161\*, where the digital signature 214s could be verified by an updated first boot firmware 160\* operating by processor 109c using the public key in cert.BF 160c"-x and parameters 111a"-x. The parameters for the digital signature 214a could comprise the selected operating set of parameters 111a"-x from a step 213 above. Server 201 could query another server, such as a server operated by the certificate authority associated with public key in cert.BF 160c"-x to generate digital signature 214a over at least the updated second boot firmware 161\*. Or, for embodiments where the entity operating the server 201 also stores or records the private key for the public key in the selected operating cert.BF 160c"-x, then server 201 could have the entity generate the digital signature 214s for the updated second boot firmware 161\*.

The second boot firmware server 201 can then send a message 215 via a secure session with device 102, where the message 215 can include the updated second boot firmware 161\*. A message 215 can include the updated second boot firmware 161\* from the steps 213 and 214, where the updated second boot firmware 161\* can be for processor 109c using a processor configuration 109cc and also include the digital signature 214s. The depiction of "161\* (111a"-x and 160c"-x)" in FIG. 2 indicates the second boot firmware 161\* in message 215 can be verified at least using the operating parameters 111a"-x and the associated public key cert.BF 160c"-x. Message 215 can also include the operating set of cryptographic parameters 111a"-x and public key cert.BF 160c"-x (e.g. as text or encoded text outside of firmware 161\*), where the parameters and key were selected in a step 213 above. In exemplary embodiments, cryptographic algorithms supporting the operating parameters 111a"x can be included within the machine executable code of the updated first boot firmware 160\*.

At step 216, device 102 can receive the message 215 and store the received second boot firmware 161\* in a nonvolatile memory, while leaving the initial second boot firmware 161 in place (e.g. as the selected and used boot firmware after the first boot process). In other words, if device 102 rebooted immediately after a step 216 (e.g. before a step 217), then processor 109c would boot with the initial first boot firmware 160 and then the initial second boot firmware 161 (and not firmware 160* and 161*) and the boot may not be successful since that would be the normal operating state for device before the use of an updated initial first boot firmware 160* as contemplated herein. A step 216 can include device 102 copying the initial second boot firmware 161 to the location of backup second boot firmware 172, such that the initial second boot firmware 161 can be used if a first boot process fails, which is also discussed in FIG. 1b above.

As described for a step 210b above, PP 101 using firmware 106 can previously copy the initial first boot firmware 160 to the location of backup first boot firmware 171 in the step 210b. For a step 217, after both (i) PP 101 writes the initial first boot firmware 160 to backup boot memory 171 and (ii) device 102 or processor 109c copying the initial second boot firmware 161 to the location of backup second boot firmware 172 from a step 216, then PP 101 or SOC 109 can request a reboot of device 102 and processor 109c and force a boot of processor 109c using the backup first boot memory 171 (with backed up initial boot firmware 160 from a step 210a) and the backup second boot memory 172 (with backed up initial second boot firmware 161 from a step 216). For example, a value or setting in processor 109c (retained for a reboot) could specify that backup first boot memory 171 is the location for the first boot firmware for processor 109c to load and also backup second boot memory 172 is the location for the second boot firmware to load after the first boot firmware.

A successful reboot from a step 217 could confirm that the initial first boot firmware 160 has been successfully stored within the backup first boot memory 171 and the initial second boot firmware 161 has been successfully store within the backup second boot memory 172. In exemplary embodiments, PP 101 using firmware 106 in a step 217 confirms that the backup requests 210b and 216 are properly processed (and boot firmwares 160 and 161 are stored and work within the backup memory 171). This confirmation of a properly operating backup can take place before both (i) PP 101 writes the updated first boot firmware 160* to memory 109f where processor 109c begins a boot process upon power up and (ii) device 102 writes the updated second boot firmware 161* to memory 102s or 109s for the selected location of memory for processor 109c to load upon conclusion of loading the updated first boot firmware 160*. In other words at a step 217 both the initial first boot firmware 160 and the initial second boot firmware 161 continue to be stored in their original memory locations (in addition to the copy to backup), such that a normal boot (e.g. not forced to use backup) would continue to process firmware 160 and then 161.

After a step 217, including a successful boot using the initial firmware 160 and 161 in backup locations 171 and 172, respectively, PP 101 using firmware 106 can conduct a step 218 to write the updated first boot firmware 160* to memory 109f. In other words, in a step 218 the firmware 106 can replace the initial first boot firmware 160 with the updated first boot firmware 160*. A step 218 can include PP 101 with firmware 106 sending a signal 218a to a device program 102i for the device program 102i to copy the updated second boot firmware 161* to the location of the initial second boot firmware 161 (e.g. a signal to update the second boot firmware).

SOC 109 using a device program 102i can then conduct a step 219. For a step 219, device 102 can copy the updated second boot firmware 161* from a message 215 and stored in an initial or temporary location to the location of the initial second boot firmware 161. In other words, a step 219 can comprise device 102 using a device program 102i (or alternatively firmware 106 in PP 101) overwriting the initial second boot firmware 161 with an updated second boot firmware 161*. Note that if power is removed from SOC 109 during either of steps 218 or 219, such that memory for the first and second boot firmwares is corrupted or improperly formatted or structured, then device 102 can still properly boot by using the backup locations of memory 171 for the first boot firmware and memory 172 for the second boot firmware. The verification of a properly working backup was also previously conducted in a step 217 before writing updated boot firmware in steps 218 and 219.

At step 220, device 102 can reboot and processor 109c can load and process the updated first boot firmware 160* from the memory 109f. As described above, the updated first boot firmware 160* can include cryptographic algorithms supporting a second set of cryptographic parameters 111a'' and a public keys 160c''. At step 221, the updated first boot firmware 160* can specify the reading and processing of the updated second boot firmware 161*, where the updated second boot firmware 161* can (i) support a subset of the second set of cryptographic parameters 111a'' comprising the operating set of cryptographic parameters 111a''-x and (ii) include the digital signature 214s. A step 222 can comprise the first boot firmware 160* (i) selecting a public key cert.BF 160c''-x for parameters 111a''-x and (ii) verifying the digital signature 214s using the selected public key cert.BF 160c''-x. The verification of digital signature 214s for a step 222 is also depicted and described in connection with FIG. 3 below. Processor 109c can conduct the steps 220 through 222.

After successful verification of digital signature 214s in a step 222, device 102 using processor 109c can begin processing and operating with the updated second boot firmware 161*. Note that the second boot firmware could include support for a different set of cryptographic parameters 111a''' and associated public keys in order to verify a digital signature for a third boot firmware loaded and verified by the second boot firmware. Device 102 could then conduct a step 223 with boot firmware and software after the updated second boot firmware 161* to load an operation system 102h and selected device programs 102i for device 102. Device 102 could then operate according to the operating system 102h and device programs 102i.

FIG. 3

FIG. 3 is a flow chart illustrating exemplary steps for creating and verifying a digital signature using PKI keys, parameters, and data input, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

In FIG. 3, signature creation 214 can comprise a step using the sub-steps of obtaining a message to sign, calculating a message digest or secure hash using a hash algorithm 111e, using a private key for the public key in a cert.BF 160c"-x, using a signature algorithm 111d, inputting operating parameters 111a"-x, and calculating a resulting signature 214s. The steps and sub steps depicted for authentication server creating signature 214s in FIG. 3 can also be applied for other digital signatures as contemplated herein, such as the generation of a digital signature 208a in a step 208, where a step 208 could use different parameters, keys and data to sign in order to generate the digital signature 208a.

Signature algorithm 111d and signature verification algorithm 111d' could comprise an RSA-based digital signature algorithm (DSA) or an ECC based elliptic curve digital signature algorithm (ECDSA), and other possibilities exist as well for signature algorithm 111d and signature verification algorithm 111d' without departing from the scope of the present invention. When using ECC or RSA based algorithms, the generation of digital signature 214a in a step 214 could utilize the steps and methods specified by the Federal Information Processing Standards publication FIPS PUB 186-4, which is herein incorporated by reference. Note that operating cryptographic parameters 111a"-x can support post-quantum cryptographic algorithms, and thus a digital signature algorithm 111d could support lattice-based algorithms, code-based algorithms, or multivariate based algorithms as discussed with PQC in FIG. 1c. In exemplary preferred embodiments, signature algorithm 111d in a step 214 and 222 can support a post-quantum cryptography algorithm.

When using a DSA or ECDSA algorithm in non-deterministic mode for a signature creation 214, a value of "k" or "r", which could comprise a random number, can be associated with the digital signature 214s. When using a DSA or ECDSA in deterministic mode, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a separately transmitted random number with digital signature 214s (such as value "k" or "r") can be optionally omitted, such that "r" can be deterministically calculated based on the message to sign. In exemplary embodiments, servers generating digital signatures in systems 100 and 200 can utilize deterministic ECDSA without also sending a random number along with a digital signature, although the value "r" from the deterministic mode could be sent with the digital signature 214s. In other words, a value can be sent with the digital signature 214s that is deterministically derived and associated with the message to sign. In other exemplary embodiments, a random number can be generated a derived value for the random number such as "r" sent with digital signature 214s.

For a signature creation 214 step, the exemplary message to sign comprises the updated second boot firmware 161*, with associated data. Note that the updated second boot firmware 161 can include certificates 161c and third set of cryptographic parameters 111a'''. The certificates 161c and parameters 111a''' can be used by the updated second boot firmware 161c to verify an updated third boot firmware loaded and processed by the updated second boot firmware 161*. The Second Boot Firmware server 201 could request the generation of the digital signature 214s with the data shown by the entity that owns and/or stores the private key for the public key in the selected operating public key for the updated first boot firmware 160* of 160c"-x.

The updated second boot firmware 161* can be input into a message digest algorithm comprising a secure hash algorithm 111e, which could comprise a standard algorithm such as SHA-256, SHA-3, or similar algorithms. The output of message digest algorithm using a secure hash 111e can be input along with parameters 111a"-x and private key corresponding to cert.BF 160c"-x into signature algorithm 111d.

Parameters 111a"-x can specify encoding rules, padding, key lengths, selected algorithms, curve names, and other values or fields necessary to utilize a signature algorithm 111d. Both a signature creation step 214 and a signature verification step 222 use the same or equivalent values for parameters 111a"-x. Although not depicted in FIG. 3, a random number for values such as "k" and "r" for ECDSA and related signatures could be input as well into a signature algorithm 111d. The output of a signature algorithm 214 can be a signature 214s, which can be included with the updated second boot firmware 161*

Signature verification 222 can comprise a step using the sub-steps of obtaining a message to verify, calculating a message digest comprising a secure hash algorithm 111e, using a public key for cert.BF 160c"-x, using a signature verification algorithm 111d', inputting parameters 111a"-x and signature 214s, and determining a pass/fail 222'. If the signature 214s received matches a calculated signature with the public key for cert.BF 160c"-x and the same firmware 161*, then the received signature 214s passes or is validated or verified. If the signature 214s does not match the calculated signature in a step 222, then the signature 214s is considered to fail or not be verified. In exemplary embodiments if the verification of a signature 214s fails, then processor 109c can reboot using the backup first boot firmware in memory 171 and backup second boot firmware in memory 172.

CONCLUSION

Various exemplary embodiments have been described above. Those skilled in the art will understand, however, that changes and modifications may be made to those examples without departing from the scope of the claims.

The invention claimed is:

1. A system for a computing device to securely update a boot process, the system comprising:
    a boot loader for storing a first public key, for loading a boot firmware, and for verifying a first digital signature of the boot firmware with the first public key;
    a first nonvolatile memory in a system on a chip (SOC) for storing the boot loader;
    a second nonvolatile memory for storing the boot firmware;
    a first processor in the SOC for operating the boot loader and the boot firmware, wherein, upon the first processor powering on, the first processor reads a startup memory address for the boot loader in the first nonvolatile memory;
    a second processor within the SOC, wherein the second processor operates a boot loader updater, and wherein the boot loader updater updates the boot loader;
    a memory interface for the first and second nonvolatile memories, wherein the first processor (i) reads from the first nonvolatile memory, (ii) cannot write to the first nonvolatile memory, and (iii) writes to the second nonvolatile memory, and wherein the second processor writes to the first nonvolatile memory; and
    an updated boot loader for storing a second public key, and for verifying a second digital signature of an updated boot firmware with the second public key; and
    a network interface for the second processor to download the updated boot loader from a configuration server, and for the first processor to download the updated boot firmware from a server, wherein the updated boot firmware includes the second digital signature.

2. The system of claim 1, wherein the second processor operates a primary platform with a secondary platform, and wherein the primary platform receives a boot update image as a secondary platform bundle from an image delivery server, and wherein the boot update image comprises the boot loader updater.

3. The system of claim 2, wherein the primary platform operates the secondary platform, and wherein the secondary platform operates the boot update image.

4. The system of claim 2, wherein the SOC includes a processor configuration, wherein the secondary platform sends the processor configuration to the configuration server before the second processor downloads the updated boot loader.

5. The system of claim 4, wherein the processor configuration includes an identity for the first processor, and wherein the configuration server selects the updated boot loader using the processor configuration.

6. The system of claim 2, wherein the secondary platform bundle includes a secure session library, and wherein the primary platform uses the secondary platform bundle and secure session library to download the updated boot loader.

7. The system of claim 1, wherein the first public key supports at least one of elliptic curve cryptography (ECC) and RSA algorithms, and wherein the second public key supports a post-quantum cryptography algorithm.

8. The system of claim 1, wherein the updated boot loader includes the first public key, and wherein the updated boot firmware includes the first digital signature.

9. The system of claim 1, wherein the updated boot loader does not include the first public key, and wherein the updated boot firmware includes the second digital signature.

10. The system of claim 1, wherein the first processor comprises a primary core and the startup memory address comprises a memory address location 0x00000000.

11. A method for a primary platform with a secondary platform to securely update a first boot loader for a computing device, the method comprising:
    receiving a secondary platform bundle via an open firmware loader operating in the computing device, wherein the secondary platform bundle includes a boot update image;
    operating, by the primary platform, the boot update image as the secondary platform;
    reading, by the secondary platform, a processor configuration;
    establishing, by the secondary platform, a secure session with a configuration server;
    sending, by the secondary platform, the processor configuration to the configuration server;
    receiving, by the secondary platform and from the configuration server, an updated boot loader for a processor with the processor configuration, wherein the updated boot loader includes a first public key and a first digital signature algorithm; and
    storing, by the secondary platform, the updated boot loader in a nonvolatile memory for the first boot loader, wherein the processor cannot write to the nonvolatile memory, and wherein the processor uses the updated boot loader and the first public key and the first digital signature algorithm to verify a digital signature for an updated boot firmware for the processor.

12. The method of claim 11, wherein the processor a downloads the updated boot firmware, and wherein the processor operates the updated boot firmware after verifying the digital signature, and wherein the updated boot firmware loads an operating system for the computing device.

13. The method of claim 12, wherein the processor uses the first boot loader to load the operating system before the processor downloads the updated boot firmware.

14. The method of claim 11, wherein the first boot loader includes a second public key and a second digital signature algorithm, and wherein the second public key and the second digital signature algorithm support at least one of elliptic curve cryptography (ECC) and RSA algorithms, and wherein the first public key and first digital signature algorithm supports a post-quantum cryptography algorithm.

15. The method of claim 14, wherein the updated boot loader includes the second public key and the second digital signature algorithm, and wherein the processor operates the updated boot loader to load one of the updated boot firmware and an initial boot firmware.

16. The method of claim 14, wherein the updated boot loader does not include the second public key and the second digital signature algorithm, and wherein the updated boot loader loads the updated boot firmware.

17. The method of claim 11, wherein the processor comprises a primary core for the computing device, and the nonvolatile memory includes a memory address location 0x00000000.

18. The method of claim 11, wherein the secondary platform replaces the first boot loader with the updated boot loader in the nonvolatile memory, and wherein the processor operates the updated boot loader in order to load the updated boot firmware.

19. The method of claim 11, wherein the processor operates the open firmware loader, and wherein the computing device downloads the secondary platform bundle from an image delivery server.

20. The method of claim 11, wherein the first public key and first digital signature algorithm supports a post-quantum cryptography algorithm.

\* \* \* \* \*